US012576841B2

(12) United States Patent (10) Patent No.: US 12,576,841 B2
Liu (45) Date of Patent: Mar. 17, 2026

(54) ACTIVE SAFETY DRIVER ASSISTANCE SYSTEM BASED ON DRIVER REAL-TIME STATE MONITORING

(71) Applicant: THE THIRD RESEARCH INSTITUTE OF MINISTRY OF PUBLIC SECURITY, Shanghai (CN)

(72) Inventor: Caixia Liu, Shanghai (CN)

(73) Assignee: THE THIRD RESEARCH INSTITUTE OF MINISTRY OF PUBLIC SECURITY, Shanghai (CN)

( * ) Notice: Subject to any disclaimer, the term of this patent is extended or adjusted under 35 U.S.C. 154(b) by 110 days.

(21) Appl. No.: 18/681,830

(22) PCT Filed: Nov. 4, 2022

(86) PCT No.: PCT/CN2022/129870
§ 371 (c)(1),
(2) Date: Feb. 6, 2024

(87) PCT Pub. No.: WO2023/236432
PCT Pub. Date: Dec. 14, 2023

(65) Prior Publication Data
US 2024/0336262 A1      Oct. 10, 2024

(30) Foreign Application Priority Data

Jun. 7, 2022      (CN) ......................... 202210642186.5

(51) Int. Cl.
*B60W 30/14*      (2006.01)
*B60W 10/04*      (2006.01)
(Continued)

(52) U.S. Cl.
CPC .......... *B60W 30/146* (2013.01); *B60W 10/04* (2013.01); *B60W 10/18* (2013.01);
(Continued)

(58) Field of Classification Search
CPC ..... B60K 28/063; B60W 10/04; B60W 10/18; B60W 2040/0818; B60W 2050/143;
(Continued)

(56) References Cited

U.S. PATENT DOCUMENTS 11,801,872 B2 * 10/2023 Moriya ................ G05D 1/0061
2009/0322506 A1 * 12/2009 Schmitz ................. G08B 21/06
340/439

(Continued)

FOREIGN PATENT DOCUMENTS

CN      108688673      10/2018
CN      109572705      4/2019
(Continued)

OTHER PUBLICATIONS

Liu, Caixia; International Search Report and Written Opinion for PCT/CN2022/129870, filed Nov. 4, 2022, mailed Dec. 16, 2022, 15 pages.

*Primary Examiner* — Babar Sarwar
(74) *Attorney, Agent, or Firm* — Taylor Duma LLP

(57)      ABSTRACT

The present invention discloses an active safety driver assistance system based on real-time driver state monitoring. The system performs driver sentiment identification and/or intelligent driver behavior analysis and/or driver seat sensing and monitoring data analysis, and performs operations such as automatic speed control to control a vehicle action. The system monitors a real-time sentiment, a driving behavior, and a fatigue state of a driver during driving, and realizes intelligent linkage to control a travelling state of a vehicle and/or provides a safety warning for the driver based on a monitoring result, so as to ensure traffic safety of commercial vehicles included in the term "two types of passenger
(Continued)

vehicles, one type of hazardous goods vehicles, one type of freight vehicles, and one type of school vehicles" from a perspective of drivers.

10 Claims, 4 Drawing Sheets

(51) Int. Cl.
    *B60W 10/18*         (2012.01)
    *B60W 50/14*         (2020.01)

(52) U.S. Cl.
    CPC ....... *B60W 50/14* (2013.01); *B60W 2050/143* (2013.01); *B60W 2540/043* (2020.02); *B60W 2540/221* (2020.02); *B60W 2540/223* (2020.02); *B60W 2540/30* (2013.01); *B60W 2556/45* (2020.02); *B60W 2756/10* (2020.02)

(58) Field of Classification Search
    CPC ..... B60W 2420/403; B60W 2540/043; B60W 2540/221; B60W 2540/223; B60W 2540/30; B60W 2556/45; B60W 2756/10; B60W 30/146; B60W 50/14
    See application file for complete search history.

(56) References Cited

U.S. PATENT DOCUMENTS

| 2016/0167670 A1* | 6/2016 | Gjikokaj | B60W 40/08 |
| | | | 701/1 |
| 2018/0105180 A1* | 4/2018 | Fung | A61B 5/1122 |
| 2018/0281810 A1* | 10/2018 | Tochioka | B60W 40/09 |
| 2019/0049965 A1* | 2/2019 | Tanriover | G08G 1/01 |
| 2020/0079386 A1* | 3/2020 | Kim | G06V 20/588 |
| 2020/0207359 A1* | 7/2020 | Tang | G07C 5/0808 |
| 2020/0247420 A1* | 8/2020 | Gunaratne | G06V 10/82 |
| 2021/0053565 A1* | 2/2021 | Kim | B60W 30/182 |
| 2021/0331710 A1* | 10/2021 | Moriya | G05D 1/227 |
| 2025/0067570 A1* | 2/2025 | Ivanov | G06V 20/597 |

FOREIGN PATENT DOCUMENTS

| CN | 108688673 B | * | 4/2021 | ....... B60W 50/0098 |
| CN | 113353086 | | 9/2021 | |
| CN | 114360210 | | 4/2022 | |
| CN | 114802266 | | 7/2022 | |
| CN | 114834474 | | 8/2022 | |
| CN | 115056786 | | 9/2022 | |
| GB | 2598309 A | * | 3/2022 | ............ B60W 50/12 |

* cited by examiner

ACTIVE SAFETY DRIVER ASSISTANCE SYSTEM BASED ON DRIVER REAL-TIME STATE MONITORING

CROSS-REFERENCE TO RELATED APPLICATIONS

The present application is a National Stage application of PCT international application: PCT/CN2022/129870, filed on 4 Nov. 2022, the disclosure of which is hereby incorporated by reference in its entirety.

TECHNICAL FIELD

The present invention relates to safety monitoring technologies for vehicle transportation, and in particular, to a travelling safety monitoring of all commercial vehicles such as highway passenger vehicles, tourist passenger vehicles, hazardous chemical transportation vehicles, freight vehicles, school vehicles, taxis, and online vehicles or rental cars on various platforms.

BACKGROUND

The term "two types of passenger vehicles, one type of hazardous goods vehicles, one type of freight vehicles, and one type of school vehicles" encompasses chartered buses for tourists, passenger vehicles above class III, hazardous chemicals transportation vehicles for transporting hazardous chemicals/fireworks/civilian explosives, commercial vehicles for transporting goods, and passenger vehicles for transporting 7 or more students undergoing compulsory education. A very serious consequence occurs when such vehicles encounter a traffic accident. Therefore, the vehicles included in the term "two types of passenger vehicles, one type of hazardous goods vehicles, one type of freight vehicles, and one type of school vehicles" are treated as key control objects by relevant industry administration departments, and are strictly checked and supervised.

In 2011, the Ministry of Transport, the Ministry of Public Transport, the State Administration of Work Safety, and the Ministry of Industry and Information Technology of China jointly issued a "Notice on Strengthening the Dynamic Supervision of Road Transport Vehicles", specifying that starting from Aug. 1, 2011, newly manufactured vehicles included in the term "two types of passenger vehicles and one type of hazardous goods vehicles" should be equipped with a satellite positioning device that meet the "GNSS System for Operating Vehicles-Technical Specification for Vehicle Terminals" and connected to the national key commercial vehicle networking and control system before delivery. For a vehicle that does not comply with the regulations, the Ministry of Industry and Information Technology forbids a product announcement of the vehicle. When processing a road transportation certificate for a vehicle, the road transportation management department needs to check mounting and operating statuses of a satellite positioning device of the vehicle. For any new vehicle not equipped with the satellite positioning device based on the regulations, the traffic department does not issue a road transportation certificate.

Over a decade, the installation and use of an on-board terminal with the satellite positioning system of road traffic vehicles have played an important role in promoting travelling safety management of the vehicles included in the term "two types of passenger vehicles and one type of hazardous goods vehicles" and preventing malignant traffic accidents of the vehicles included in the term "two types of passenger vehicles and one type of hazardous goods vehicles".

However, as specified in the traffic industry standard JT/T 794-2019 "GNSS System for Operating Vehicles-Technical Specification for Vehicle Terminals", a fatigue driving prompt is triggered when a single continuous driving time or an accumulative driving time of a vehicle or a driver exceeds a fatigue driving time threshold, and the fatigue driving time may be remotely set by a monitoring center. The single continuous driving time is 4 h by default, and the accumulative driving time is 8 h by default. Despite of the regulation, it cannot be determined whether a driver has performed long-time driving before driving a current vehicle and a true fatigue level when driving the current vehicle. In this case, the driver may already be in a fatigue driving state before the fatigue driving alarm specified in JT/T 794-2019 is triggered, resulting in drowsiness, inattention, slow response, a reduced ability of judgment, increased misoperations, and even mind wandering as a result of the fatigue driving, which may lead to serious traffic accidents such as a collision, a rollover, and falling from cliff.

In addition, an unsafe driving behavior prompt specified in the traffic industry standard JT/T 794-2019 "GNSS System for Operating Vehicles-Technical Specification for Vehicle Terminals" is mainly designed for smoking, calling, distraction, and dozing of a driver, which ignores a body pose and a sentimental state of the driver that may cause a traffic accident.

However, accidents caused by a poor driving skill account only a small proportion in numerous traffic accidents that occur every year, and most accidents are caused by a bad sentimental state of drivers. In a sever case, subjective accidents may be caused by "road rage" resulted from bad sentiments.

Moreover, in recent years, the vehicles included in the term "one type of freight vehicles and one type of school vehicles" not incorporated into management of "two types of passenger vehicles and one type of hazardous goods vehicles", that is, commercial trucks and school vehicles with more than 7 seats are also treated as key control objects. Effective control is also required for other commercial vehicles, such as taxis and online vehicles and rental cars on various platforms.

Therefore, how to effectively monitor and actively process potential accident risks that may be caused by a driver, to effectively improve operating safety of all commercial vehicles such as vehicles included in the term "two types of passenger vehicles, one type of hazardous goods vehicles, one type of freight vehicles, and one type of school vehicles", taxis, online vehicles and rental cars on various platforms is a problem urgently to be resolved in the art.

SUMMARY

In view of the problem and the defect in application of an existing on-board terminal for safety supervision of commercial vehicles, a travelling safety assistant driving solution that can realize effective monitoring of an actual driving state of a vehicle driver is required, to realize effective monitoring and active processing of an accident risk caused by a driver, so as to overcome a defect in a safety supervision technology for various commercial vehicles, omit the risk caused by the defect in the applied existing solution, and eliminate a hidden safety hazard caused by a driver.

The present invention is intended to provide an active safety driver assistance system based on real-time driver state monitoring, which adopts a plurality of driver state monitoring technologies and is linked to a vehicle controller, so as to realize effective warning and active processing of a potential accident risk that may be caused by the driver, prevent the driver from driving a vehicle in an abnormal sentimental state that hinders safe driving or in a fatigue state or making an abnormal behavior that hinders travelling safety, ensure that the driver safely drives the vehicle in a normal sentimental, mental, and physical state, and ensure that the vehicle can perform intelligent active safety control when the driver has an abnormal sentiment or an abnormal behavior or is in a fatigue state, thereby improving operating safety of the vehicle.

In order to achieve the above purposes, the active safety driver assistance system based on real-time driver state monitoring provided in the present invention includes:

a driver state monitoring unit, arranged in a cab of a transportation vehicle, on which at least a driver front face monitoring component and/or a lateral panoramic behavior monitoring component and/or a seat pressure sensing monitoring component is arranged, associated with an on-board gateway unit, a vehicle control unit, an alarm prompt unit, and associated with a remote management unit and/or the vehicle control unit through the on-board gateway unit, where the driver state monitoring unit monitors a sentiment and/or a driving behavior and/or a physical fatigue state of a driver in real time, which may be transmitted to the remote management unit for sentiment identification and/or behavior analysis and/or fatigue state determination through an edge computing module of the state monitoring unit hardware, an edge computing module of the on-board gateway unit, or a network communication module of the on-board gateway unit, be associated with the vehicle control unit directly or through the on-board gateway unit based on a real-time sentiment identification result and/or an abnormal behavior analysis result and/or a fatigue state determination result or a management command generated acquired from the remote management unit through the on-board gateway unit that is generated based on the real-time sentiment identification result and/or the abnormal behavior analysis result and/or the fatigue state determination result, and controls an operating state of an anti-lock (ABS) module, a speed limit management module, an intelligent brake management module, or an electronic brake assist (EBA) module to perform speed limit, speed control, or deceleration;

an on-board gateway unit, associated with the driver state monitoring unit, the vehicle control unit, the alarm prompt unit, and the remote management unit, and configured to complete driver state monitoring in cooperation with the driver state monitoring unit, where the on-board gateway unit is specifically arranged in the cab of the vehicle, and is associated with the driver state monitoring unit, the vehicle control unit, the alarm prompt unit, and the remote management unit; the on-board gateway unit has at least the network communication module and/or a data storage module and/or the edge computing module, establishes a communication channel with the remote management unit to compare, identify, and analyze data information generated by the driver state monitoring unit or transmit relevant information to the remote management unit for comparison, identification, and analysis, and send management data information returned by the remote management unit to the vehicle control unit and the alarm prompt unit;

the vehicle control unit, arranged in the cab of the vehicle or an engine compartment of the vehicle, linked to a speed control system and a braking system of the vehicle, associated with the on-board gateway unit and the driver state monitoring unit, and associated with the alarm prompt unit, the remote management unit, and/or the driver state monitoring unit through the on-board gateway unit, where the vehicle control unit controls or does not control the vehicle to perform speed limit, deceleration, or emergency braking depending on a real-time sentimental state analysis result, a driving behavior analysis result, and the fatigue state determination result of the driver sent by the driver state monitoring unit or the on-board gateway unit;

the alarm prompt unit, arranged in the cab of the transportation vehicle and on exterior of the vehicle and connected to the driver state monitoring unit and the on-board gateway unit, and configured to send a voice prompt or an acousto-optic alarm based on a real-time sentimental state and driving behavior analysis result of the driver sent by the driver state monitoring unit or the on-board gateway unit; and the remote management unit, configured to: complete the driver state monitoring through cooperation between the vehicle control unit and the driver state monitoring unit, provide a corresponding vehicle and driver management control command, and feed back the vehicle and driver management control command to the on-board gateway unit. The remote management unit is arranged on a cloud platform of a vehicle transportation-related government industry administration department and/or a local storage server and/or a personal handheld intelligent terminal of a relevant management person, a cloud platform of a transportation enterprise to which the vehicle belongs and a transportation-related party and/or a local storage server and/or a personal handheld intelligent terminal of a relevant management person, and a personal handheld intelligent terminal of a driver and passenger, and is connected to the on-board gateway unit. The remote management unit is configured to: receive a driver state monitoring result sent by the on-board gateway unit and provide a vehicle and driver management control command; or receive a driver state monitoring information acquisition result, perform identification, analysis, or determination based on the real-time sentiment and/or the abnormal driving behavior and/or the fatigue state of the driver, and provide a vehicle and driver management control command based on the sentiment identification result and/or the abnormal behavior analysis result and/or the fatigue state determination result; feed back the vehicle and driver management control command to the alarm prompt unit or the vehicle control unit through the on-board gateway unit; and send an acousto-optic alarm or a voice prompt or control the vehicle to perform speed limit, deceleration, or emergency braking.

Further, the driver state monitoring unit includes a real-time sentiment identification module and/or an abnormal behavior monitoring module and/or a fatigue state monitoring module.

The real-time sentiment identification module is configured to obtain a dynamic facial expression of a current driver, and transmit the obtained dynamic facial expression to an intelligent sentiment analysis module thereof or an intelligent sentiment analysis module of the on-board gateway unit, or to an intelligent sentiment analysis module of the remote management unit through the on-board gateway unit.

The abnormal behavior monitoring module is configured to obtain a face movement or a body movement of the current driver, and transmit the obtained face movement or body movement to an abnormal behavior analysis module thereof or an abnormal behavior analysis module of the on-board gateway unit, or to an abnormal behavior analysis module of the remote management unit through the on-board gateway unit.

The fatigue state monitoring module is configured to obtain fatigue state monitoring information of the current driver, and transmit the fatigue state monitoring information to a fatigue state determination module thereof or a fatigue state determination module of the on-board gateway unit, or to a fatigue state determination module of the remote management unit through the on-board gateway unit.

Further, the real-time sentiment identification module of the driver state monitoring unit includes a high-speed face photographing device and an intelligent sentiment analysis and identification device.

The high-speed face photographing device is configured to acquire the dynamic facial expression of the current driver. The high-speed face photographing device includes but is not limited to an external high-speed video acquisition camera and a built-in high-speed video acquisition camera, and a type of the high-speed face photographing device includes but is not limited to a visible light high-speed video acquisition camera, a near-infrared high-speed video acquisition camera, a dedicated high-speed camera for acquiring a three-dimensional dynamic facial expression, or a high-speed instrument for acquiring a three-dimensional dynamic facial expression.

The intelligent sentiment analysis and identification device is configured to perform intelligent analysis and identification based on the dynamic facial expression acquired by the high-speed face photographing device, and determine a real-time sentimental state of the current driver. A type of the intelligent sentiment analysis and identification device includes but is not limited to an intelligent sentiment analysis and identification component inside the driver state monitoring unit, an intelligent sentiment analysis and identification component inside the on-board gateway unit, and an intelligent sentiment analysis and identification component inside the remote management unit. A type of the intelligent sentiment analysis and identification device includes but is not limited to a facial expression analysis device or a micro-expression analysis device and a facial micro-vibration analysis device depending on different technical principles.

Further, the abnormal behavior monitoring module of the driver state monitoring unit includes a head and face video acquisition device, a panoramic body video acquisition device, and an abnormal behavior analysis and identification device.

The head and face video acquisition device is configured to acquire head and face movements of the current driver. The head and face video acquisition device includes but is not limited to an external video acquisition camera and a built-in video acquisition camera, and a type of the head and face video acquisition device includes but is not limited to a visible light video acquisition camera and a near-infrared video acquisition camera.

The panoramic body video acquisition device is configured to acquire a body movement and a pose of the current driver. The panoramic body video acquisition device includes but is not limited to an external video acquisition camera and a built-in video acquisition camera, and a type of the panoramic body video acquisition device includes but is not limited to a visible light video acquisition camera and an infrared video acquisition camera.

The abnormal behavior analysis and identification device is configured to perform intelligent analysis and identification based on the head and face movements acquired by the head and face video acquisition device and the body movement and the pose acquired by the panoramic body video acquisition device, to determine whether a real-time behavior state of the current driver is abnormal. The abnormal behavior analysis and identification device includes but is not limited to an abnormal behavior analysis and identification component inside the driver state monitoring unit, an abnormal behavior analysis and identification component inside the on-board gateway unit, and an abnormal behavior analysis and identification component inside the remote management unit. A type of the abnormal behavior analysis and identification device includes a head and face movement analysis device or a body movement and pose analysis device.

Further, the fatigue state monitoring module of the driver state monitoring unit includes a head and face video acquisition device, a video analysis-based fatigue state analysis device, a seat load state acquisition device, and a sensor network analysis-based fatigue state analysis device.

The head and face video acquisition device is configured to acquire head and face movements of the current driver. The head and face video acquisition device includes but is not limited to an external video acquisition camera and a built-in video acquisition camera, and a type of the head and face video acquisition device includes but is not limited to a visible light video acquisition camera and a near-infrared video acquisition camera.

The video analysis-based fatigue state analysis device is configured to perform intelligent analysis and identification based on the head and face movements acquired by the head and face video acquisition device, to determine a fatigue degree of the real-time state of the current driver. The video analysis-based fatigue state analysis device includes but is not limited to a video analysis-based fatigue state analysis and identification component inside the driver state monitoring unit, a video analysis-based fatigue state analysis and identification component inside the on-board gateway unit, and a video analysis-based fatigue state analysis and identification component inside the remote management unit.

The seat load state acquisition device is configured to acquire a load distribution of different points of a seat under the driver. The seat load state acquisition device includes but is not limited to pressure sensors on an external cushion and an external backrest laid on a seat and a built-in pressure sensor inside the seat, and a type of the seat load state acquisition device includes but is not limited to a piezoelectric sensor, a piezoresistive sensor, and a strain sensor depending on different technical principles.

The sensor network analysis-based fatigue state analysis device is configured to perform intelligent analysis and identification based on the load state of the different points of the seat under the driver acquired by the seat load state acquisition device, and determine a fatigue degree of the real-time state of the current driver. The sensor network analysis-based fatigue state analysis device includes but is not limited to a sensor network analysis-based fatigue state analysis and identification component inside the driver state monitoring unit, a sensor network analysis-based fatigue state analysis and identification component inside the on-board gateway unit, and a sensor network analysis-based fatigue state analysis and identification component inside the remote management unit.

Further, the driver state monitoring unit is directly associated with the vehicle control unit or indirectly associated with the vehicle control unit and/or the remote management unit through the on-board gateway unit. When the driver state monitoring unit is directly associated with the vehicle control unit, and the real-time sentiment identification result and/or the abnormal behavior monitoring result and/or the fatigue state monitoring result of the driver reaches or exceeds a danger threshold, the vehicle control unit controls the vehicle to perform speed limit, deceleration, or emergency braking, and the alarm prompt unit sends an alarm prompt of a dangerous state or a dangerous behavior, and the analysis, identification, or determination result and the action state of the vehicle control unit are uploaded to the remote management unit through the on-board gateway unit. When the driver state monitoring unit is indirectly associated with the vehicle control unit through the on-board gateway unit, after the real-time sentiment identification result and/or the abnormal behavior monitoring result and/or the fatigue state monitoring result of the driver reaches or exceeds the danger threshold, the on-board gateway unit sends a command to the vehicle control unit, and the vehicle control unit controls the vehicle to perform speed limit, deceleration, or emergency braking, and the alarm prompt unit sends a dangerous state or dangerous behavior alarm prompt, and an analysis, identification, or determination result and the action state of the vehicle control unit is uploaded to the remote management unit through the on-board gateway unit. When the driver state monitoring unit is indirectly associated with the vehicle control unit through the on-board gateway unit, but the video analysis-based fatigue state analysis component or the sensor network analysis-based fatigue state analysis component is in the remote management unit, the dynamic facial expression information of the current driver acquired by the high-speed face photographing device in the real-time sentiment identification module, the head and face movement information and the body movement and pose information of the current driver respectively acquired by the head and face video acquisition device and the panoramic body video acquisition device in the abnormal behavior monitoring module, the head and face movement information of the current driver acquired by the head and face video acquisition device in the fatigue state monitoring module, and the load state information of the different points of the seat under the driver acquired by the seat load state acquisition device are uploaded to the remote management unit through the on-board gateway unit, the remote management unit performs intelligent analysis, identification, or determination, and then returns an analysis, identification, or determination result to the on-board gateway unit, the on-board gateway unit sends a command to the vehicle control unit, the vehicle control unit controls the vehicle to perform speed limit, deceleration, or emergency braking, and the alarm prompt unit sends a dangerous state or dangerous behavior alarm prompt. The action state of the vehicle control unit is uploaded to the remote management unit through the on-board gateway unit.

Further, the on-board gateway unit includes a network communication module and/or a data storage module and/or an edge computing module.

The network communication module is configured for data exchange between the driver state monitoring unit and the alarm prompt unit, the vehicle control unit, and the remote management unit, and is configured to: forward, to the remote management unit, the dynamic facial expression information of the current driver and/or the head and face movement information and the body movement and pose information of the current driver and/or the load distribution state information of the different points of the seat under the driver, or a real-time sentiment analysis and identification result and/or an abnormal behavior analysis and identification result and/or the fatigue state determination result of the driver uploaded by the driver state monitoring unit, or send a corresponding command to the vehicle control unit and the alarm prompt unit based on the received real-time sentiment analysis and identification result and/or the abnormal behavior analysis and identification result and/or the fatigue state determination result of the driver; send a corresponding command to the vehicle control unit and the alarm prompt unit based on the real-time sentiment analysis and identification result and/or the abnormal behavior analysis and identification result and/or the fatigue state determination result obtained by the edge computing module; and forward a management command received from the remote management unit to a driver identity verification unit, the driver state monitoring unit, the alarm prompt unit, or the vehicle control unit.

The data storage module is configured to store the dynamic facial expression information of the current driver and/or the head and face movement information and the body movement and pose information of the current driver and/or the load distribution state information of the different points of the seat under the driver uploaded by the driver state monitoring unit.

The edge computing module is configured to perform intelligent sentiment analysis and identification and/or abnormal behavior analysis and identification and/or fatigue state analysis and determination based on the dynamic facial expression information of the current driver and/or the head and face movement information and the body movement and pose information of the current driver and/or the load distribution state information of the different points of the seat under the driver uploaded by the driver state monitoring unit.

Further, the data storage module of the on-board gateway unit includes a built-in data storage device and an external data storage device.

Further, the edge computing module of the on-board gateway unit includes an AI smart chip with an edge computing function and a terminal SDK with an edge computing function.

The circuit board AI smart chip with the edge computing function and the terminal SDK with the edge computing function are configured to perform intelligent sentiment analysis and identification and/or abnormal behavior analysis and identification and/or fatigue state analysis and determination based on the dynamic facial expression information of the current driver and/or the head and face movement information and the body movement and pose information of the current driver and/or the load distribution state information of the different points of the seat under the driver uploaded by the driver state monitoring unit.

Further, the on-board gateway unit is directly associated with the driver state monitoring unit, the vehicle control unit, the alarm prompt unit, and the remote management unit. When the on-board gateway unit receives an abnormal driver state detection result, the on-board gateway unit sends a command to the vehicle control unit to control the vehicle to perform speed limit, deceleration, or emergency braking, sends a dangerous state or dangerous behavior alarm to the alarm prompt unit, and sends a voice prompt to prompt the driver to eliminate an abnormal sentiment and an abnormal behavior or prompt the driver to stop and rest nearby, and forwards the driver state monitoring result and the action information of the vehicle control unit to the remote management unit.

When the video analysis-based fatigue state analysis component or the sensor network analysis-based fatigue state analysis component is in the remote management unit, the on-board gateway unit forwards, to the remote management unit, the dynamic facial expression information of the current driver acquired by the high-speed face photographing device, the head and movement information and the body movement and pose information of the current driver respectively acquired by the head and face video acquisition device and the panoramic body video acquisition device, the head and face movement information of the current driver acquired by the head and face video acquisition device, and the load state information of the different points of the seat under the driver acquired by the seat load state acquisition device, and the remote management unit performs intelligent analysis, identification, or determination and then sends an analysis, identification, or determination result and a command to the vehicle control unit and/or the alarm prompt unit, and then the action state of the vehicle control unit is uploaded to the remote management unit.

Further, the alarm prompt unit includes vehicle local alarm prompt subunits such as an internal cab acousto-optic alarm module, an internal cab voice prompt module, an external cab acousto-optic alarm module, and an external cab voice prompt module and remote monitoring client software alarm prompt subunits such as a government industry management client software, an enterprise operation management client software, and a driver and passenger service client software.

The internal cab acousto-optic alarm module is configured to send an acousto-optic alarm when the sentiment identification result of the driver is abnormal, an abnormal behavior occurs, and the fatigue state determination result is abnormal.

The internal cab voice prompt module is configured to: prompt the driver to adjust a sentiment or stop nearby when the sentiment identification result of the driver is abnormal, prompt the driver to correct an unsafe driving behavior when the driver has an abnormal behavior, and prompt the driver to concentrate on the driving or stop nearby when the fatigue state determination result is abnormal. The internal cab voice prompt module may be arranged independently of the internal cab acousto-optic alarm module or combined with the internal cab acousto-optic alarm module into an acousto-optic alarm device.

The external cab acousto-optic alarm module is configured to send an acousto-optic alarm when the sentiment identification result of the driver is significantly abnormal, an abnormal behavior that will cause a serious risk occurs, and the fatigue state determination result is significantly abnormal.

The external cab voice prompt module cab is configured to send a voice prompt when the sentiment identification result of the driver is significantly abnormal, an abnormal behavior that will cause a serious risk occurs, and the fatigue state determination result is significantly abnormal. The voice prompt and the alarm sound are loud enough so that passersby can become highly alert even in a noisy road environment, and content of the voice alarm is broadcast clearly enough so that listeners can clearly understand the content.

The government industry management client software is configured to receive alarm information forwarded by the on-board gateway unit through the communication center when the sentiment identification result of the driver is abnormal, an abnormal behavior occurs, and the fatigue state determination result is abnormal. The government industry management client software starts an emergency management process by default according to an emergency plan when receiving information indicating that the sentiment identification result of the driver is significantly abnormal, an abnormal behavior that will cause a serious travelling risk occurs, and the fatigue state determination result is significantly abnormal.

The enterprise operation management client software is configured to receive alarm information forwarded by the on-board gateway unit through the communication center when the sentiment identification result of the driver is abnormal, an abnormal behavior occurs, and the fatigue state determination result is abnormal. The enterprise operation management client software starts an emergency management process by default according to an emergency plan and synchronously sends emergency alarm information to the government industry management client when receiving information indicating that the sentiment identification result of the driver is significantly abnormal, an abnormal behavior that will cause a serious travelling risk occurs, and the fatigue state determination result is significantly abnormal.

The driver and passenger service client software is configured to receive alarm information forwarded by the on-board gateway unit through the communication center when the sentiment identification result of the driver is abnormal, an abnormal behavior occurs, and the fatigue state determination result is abnormal. The driver and passenger service client sends a voice prompt while sending the alarm information. Content of the voice prompt varies depending on a role of a user of the driver and passenger service client, for example, may be prompting the driver to adjust the sentiment or correct the unsafe driving behavior, or prompting the driver to concentrate on the driving or stop nearby. A hazardous chemical transportation vehicle escort service client prompts, through a voice, an escort to supervise the driver to adjust the sentiment, correct the unsafe driving behavior, or prompt the driver to concentrate on the driving, or stop nearby, or the like.

Further, the alarm prompt unit is directly associated with the driver state monitoring unit and the on-board gateway unit. When the vehicle local alarm prompt subunit receives an abnormal sentiment identification result of the driver, an abnormal behavior monitoring result, and an abnormal fatigue state monitoring result sent by the driver state monitoring unit or sent by the driver state monitoring unit through the on-board gateway unit, the alarm prompt unit sends an acousto-optic alarm and prompts the driver to adjust the sentiment, correct the unsafe driving behavior, concentrate on the driving, or park nearby through a voice. When the vehicle local alarm prompt subunit receives a significantly abnormal sentiment identification result of the driver, a significantly abnormal behavior monitoring result, and a significantly abnormal fatigue state monitoring result sent by the driver state monitoring unit or sent by the driver state monitoring unit through the on-board gateway unit, the alarm prompt unit sends an acousto-optic alarm inside and outside the vehicle, and prompts, through a voice inside and outside the vehicle, the driver to the adjust sentiment, correct the unsafe driving behavior, concentrate on the driving, or stop nearby, and prompts passersby to be alert to the abnormal vehicle, go away from the vehicle in time, or immediately call the police. When the remote monitoring client software alarm prompt subunit receives the abnormal sentiment identification result of the driver, the abnormal behavior monitoring result, and the abnormal fatigue state monitoring result sent by the driver state monitoring unit through the on-board gateway unit and through the communication center, the alarm prompt unit sends an alarm prompt or a voice prompt. When the remote monitoring client software alarm prompt subunit receives the significantly abnormal sentiment identification result of the driver, the significantly abnormal behavior monitoring result, and the significantly abnormal fatigue state monitoring result sent by the driver state monitoring unit through the on-board gateway unit and the communication center, the alarm prompt unit sends an emergency alarm and a voice prompt, and starts an emergency management process according to the emergency plan by default.

Further, the vehicle control unit includes an anti-lock (ABS) module and/or a speed limit management module and/or an intelligent brake management module and/or an electronic brake assist (EBA) module.

The anti-lock (ABS) module is configured to prevent possible travelling direction runaway or sideslip of the vehicle during emergency braking when receiving an abnormal driver state monitoring result sent by the driver state monitoring unit or forwarded by the driver state monitoring unit through the on-board gateway unit.

The speed limit management module is configured to control a maximum travelling speed of the vehicle when receiving the abnormal driver state monitoring result sent by the driver state monitoring unit or forwarded by the driver state monitoring unit through the on-board gateway unit.

the intelligent brake management module is configured to start an intelligent braking device to reduce a real-time travelling speed of the vehicle when receiving the abnormal driver state monitoring result sent by the driver state monitoring unit or forwarded by the driver state monitoring unit through the on-board gateway unit.

The electronic brake assist (EBA) module is configured to quickly start a full braking force for emergency braking when receiving the abnormal driver state monitoring result sent by the driver state monitoring unit or forwarded by the driver state monitoring unit through the on-board gateway unit, to prevent a traffic accident resulted from an excessively large braking distance caused by a slow response of the driver in the abnormal state.

Further, the vehicle control unit is directly associated with the driver state monitoring unit and the on-board gateway unit. The vehicle control unit controls the vehicle to perform speed limit, deceleration, or emergency braking when receiving the abnormal driver state detection result.

Further, the remote management unit includes a government industry management client software, an enterprise operation management client software, a driver and passenger service client software, and a communication center.

Further, the government industry management client of the remote management unit includes a public security industry management client software, a traffic industry management client software, an emergency industry management client software, and another industry management client software (such as an insurance industry management client software) depending on different industry administration departments.

Further, the enterprise operation management client of the remote management unit includes a consigner management client software, a carrier management client software, and a receiver management client software depending on different users.

Further, the driver and passenger service management client of the remote management unit includes a driver service client software and an escort service client software depending on different users.

Further, the communication center of the remote management unit includes a cloud platform, a local server, and a personal mobile intelligent terminal.

The cloud platform is configured for storage of data information uploaded by the driver state monitoring unit, intelligent analysis, identification, or determination based on the data information uploaded by the driver state monitoring unit, receipt of data of the government industry management client software/the enterprise operation management client software/the driver and passenger service client software, and communication interaction among a called shared data resource pool, a computer hardware platform environment supporting application of the government industry management client software/the enterprise operation management client software/the driver and passenger service client software, the government industry management client software/ the enterprise operation management client software/the driver and passenger service client software, and an on-board gateway unit. The cloud platform communicates with on-board gateway unit, and receives and stores the dynamic facial expression information of the current driver acquired by the high-speed face photographing device in the real-time sentiment identification module in the driver state monitoring unit, the head and face movement information and the body movement and pose information of the current driver respectively the acquired by the head and face video acquisition device and the panoramic body video acquisition device in the abnormal behavior monitoring module, the head and face movement information of the current driver acquired by the head and face video acquisition device in the fatigue state monitoring module and the load state information of the different points of the seat under the driver acquired by the seat load state acquisition device, or the driver state monitoring result forwarded by the driver state monitoring unit through the on-board gateway unit. When the intelligent sentiment analysis and identification component, the abnormal behavior analysis and identification component, the video analysis-based fatigue state analysis component, or the sensor network analysis-based fatigue state analysis component is arranged on the cloud platform, through the cloud platform, intelligent sentiment analysis and identification, abnormal behavior analysis and identification, fatigue state analysis and determination are performed, and a management command or a response command of the government industry management client software, the enterprise operation management client software, or the driver and passenger service client software is forwarded to the on-board gateway unit.

The local server is configured for storage of data information uploaded by the driver state monitoring unit, intelligent analysis, identification, or determination based on the data information uploaded by the driver state monitoring unit, receipt of data of the government industry management client software/the enterprise operation management client software/the driver and passenger service client software, and communication interaction among a called data source, a computer hardware platform environment supporting application of the government industry management client software/the enterprise operation management client software/the driver and passenger service client software, the government industry management client software/the enterprise operation management client software/the driver and passenger service client software, and the on-board gateway unit. The local server communicates with the on-board gateway unit, receives and stores the dynamic facial expression information of the current driver acquired by the high-speed face photographing device in the real-time sentiment identification module in the driver state monitoring unit, the head and face movement information and the body movement and pose information of the current driver respectively acquired by the head and face video acquisition device and the panoramic body video acquisition device in the abnormal behavior monitoring module, the head and face movement information of the current driver acquired by the head and face video acquisition device in the fatigue state monitoring module and the load state information of the different points of the seat under the driver acquired by the seat load state acquisition device, or the driver state monitoring result forwarded by the driver state monitoring unit through the on-board gateway unit. When the intelligent sentiment analysis and identification component, the abnormal behavior analysis and identification component, the video analysis-based fatigue state analysis component, or the sensor network analysis-based fatigue state analysis component is arranged on the local server, through the local server, intelligent sentiment analysis and identification, abnormal behavior analysis and identification, fatigue state analysis and determination are performed, and a management command or a response command of the government industry management client software, the enterprise operation management client software, or the driver and passenger service client software is forwarded to the on-board gateway unit.

The personal handheld intelligent terminal is configured for communication interaction among an online querying tool and a temporary storage space of the data information uploaded by the driver state monitoring unit, a computer hardware environment supporting application of the government industry management mobile client APP software/the enterprise operation management mobile client APP software/the driver and passenger service mobile client APP software, the government industry management mobile client APP software/the enterprise operation management mobile client APP software/the driver and passenger service mobile client APP software, and the cloud platform or the local server or the on-board gateway unit. The personal handheld intelligent terminal communicates with the on-board gateway unit through the cloud platform or the local server, receives driver state monitoring and alarm information forwarded by the driver state monitoring unit through the on-board gateway unit and through the cloud platform or the local server, and forwards a management command or a response command of the government industry management mobile client APP software/the enterprise operation management mobile client APP software/the driver and passenger service mobile client APP software to the on-board gateway unit.

Further, the remote management unit is arranged on a cloud platform of a vehicle transportation-related government industry administration department and/or a local storage server and/or a personal handheld intelligent terminal of a relevant management person, a cloud platform of a transportation enterprise to which the vehicle belongs and a transportation-related party and/or a local storage server and/or a personal handheld intelligent terminal of a relevant management person, and a personal handheld intelligent terminal of a driver and passenger, and is connected to the on-board gateway unit. The remote management unit is configured to: receive a driver state monitoring result sent by the on-board gateway unit and provide a vehicle and driver management control command; or receive a driver state monitoring information acquisition result sent by the on-board gateway unit, perform identification, analysis, or determination based on the real-time sentiment and/or the abnormal driving behavior and/or the fatigue state of the driver, and provide a vehicle and driver management control command based on the sentiment identification result and/or the abnormal behavior analysis result and/or the fatigue state determination result; feed back the vehicle and driver management control command to the alarm prompt unit or the vehicle control unit through the on-board gateway unit; and send an acousto-optic alarm or a voice prompt or control the vehicle to perform speed limit, deceleration, or emergency braking.

The active safety driver assistance system based on real-time driver state monitoring provided in the present invention can monitor the real-time sentiment, the driving behavior, and the fatigue state of the driver during driving, and can realize intelligent linkage in an active driving assistant safety prevention way to control a travelling state of a vehicle and provide a safety warning for the driver based on a monitoring result, thereby ensuring operating safety for vehicle transportation from a perspective of drivers.

Specifically, the active safety driver assistance system based on real-time driver state monitoring provided in the present invention can monitor the dynamic facial expression or a facial vibration amplitude, the face movement, and the body movement and the pose, and the load state of the different areas of the seat under the driver during driving of the vehicle, comprehensively analyze the real-time sentimental state of the driver, intelligently identify whether the driver has an abnormal behavior that affects safe driving, precisely determine a real-time fatigue level of the driver, and automatically control the vehicle to automatically perform speed limit, deceleration, or emergency braking based on analysis, identification, and determination results of sentimental state, abnormal behavior monitoring, and real-time fatigue state, and simultaneously send a voice prompt or an acousto-optic alarm, thereby realizing effective warning and active processing of a potential accident risk that may be caused by the driver, preventing the driver from driving the vehicle in an abnormal sentimental state that hinders safe driving or in a fatigue state or making an abnormal behavior that hinders travelling safety, ensuring that the driver safely drives the vehicle in a normal sentimental, mental, and physical state, and ensuring that a vehicle can perform intelligent active safety control when the driver has an abnormal sentiment or an abnormal behavior or is in a fatigue state, thus improving operating safety of the vehicle.

Moreover, the remote management unit in the active safety driver assistance system provided in the present invention not only assists in achieving overall safety monitoring function of the above system, but also provides a basis and a specific solution for the management of the identity and the working state of the driver for a transportation-related enterprise operation management unit such as a carrier, a consigner, or a receiver, provides an evaluation and management basis for the identity and the working state of the driver and the overall safety operating state of the affiliated enterprise for a government industry management department such as a public security organization, traffic management, or emergency management, and provides a safe driving service support for the driver. Through the joint efforts of the plurality of parties and integrated application of advanced technologies, a hidden safety hazard during travelling of vehicles included in the term "two types of passenger vehicles, one type of hazardous goods vehicles, one type of freight vehicles, and one type of school vehicles" caused by the driver is eliminated, occurrence of a serious accident and a traffic accident that lead to group deaths and injuries is effectively prevented, thereby protecting safety of people's lives and property, maintaining national stability, and ensuring social harmony.

BRIEF DESCRIPTION OF THE DRAWINGS

The present invention is further described below with reference to drawings and specific implementations.

DETAILED DESCRIPTION

Figure 1:
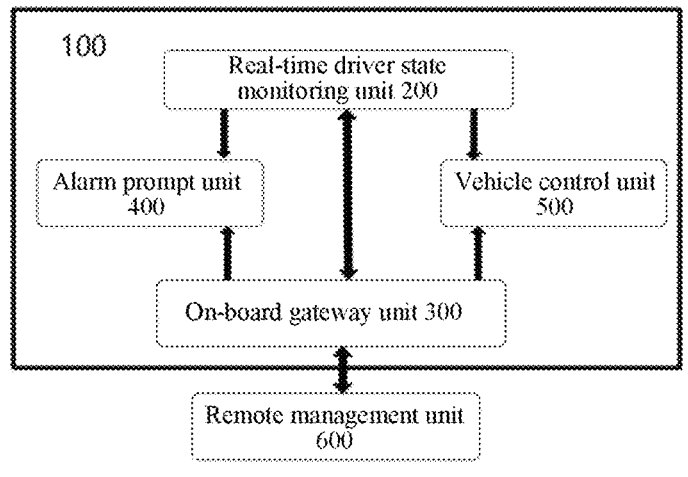
FIG. 1 is a schematic diagram of a composition principle and a usage process of an active safety driver assistance system based on real-time driver state monitoring according to an embodiment of the present invention.

In order to make technical means, creative features, purposes, and efficacy of the present invention easy to understand, the present invention is further elaborated below with reference to the drawings.

An existing on-board terminal application for supervision of a commercial vehicle generally monitors single data of a vehicle and a driver under supervision, which may monitor only positioning data of a to-be-supervised vehicle and a continuous driving time off a vehicle driver, and determines whether the driver is driving in a fatigue state based on the monitored continuous driving time. The monitored data is only used for subsequent administrative management and cannot be used for achieving real-time control of the vehicle and/or the driver and warning and processing of the vehicle travelling state and/or the driver state. Therefore, many problems and defects exist in an actual application process, especially problems regarding time relevancy and full coverage of control of the vehicle and/or the driver.

Therefore, in the present invention, a real-time sentiment, driving behavior, and fatigue state of the driver during driving are monitored in real time from the perspective of driver management, and real-time linkage is performed based on the monitoring result to control the driving state of the vehicle and/or form a safety warning for the driver, so as to realize intelligent warning for a hidden safety hazard caused by a driver, and intelligently control the driving state of the vehicle through linkage, thereby eliminating the hidden safety hazard caused by the driver, and ensuring transportation safety of a corresponding vehicle from the perspective of driver management.

Therefore, the present invention provides an active safety driver assistance system based on real-time driver state monitoring. The monitoring system can monitor a dynamic facial expression or a facial vibration amplitude, a face movement, and a body movement and a pose, and a load state of different areas of a seat under the driver during driving of the vehicle, comprehensively analyze a real-time sentimental state of the driver, intelligently identify whether the driver has an abnormal behavior that affects safe driving, precisely determine a real-time fatigue level of the driver, and automatically control the vehicle to automatically perform speed limit, deceleration, or emergency braking based on analysis, identification, and determination results of the sentimental state, abnormal behavior monitoring, and the real-time fatigue state, and simultaneously send a voice prompt or an acousto-optic alarm, thereby realizing effective warning and active processing of a potential accident risk that may be caused by the driver, preventing the driver from driving the vehicle in an abnormal sentimental state that hinders safe driving or in a fatigue state or making an abnormal behavior that hinders travelling safety, ensuring that the driver safely drives the vehicle in a normal sentimental, mental, and physical state, and ensuring that a vehicle can perform intelligent active safety control when the driver has an abnormal sentiment or an abnormal behavior or is in a fatigue state, and thus preventing traffic safety accidents of corresponding vehicles, for example, commercial vehicles such as those included in the term "two types of passenger vehicles, one type of hazardous goods vehicles, one type of freight vehicles, and one type of school vehicles", taxis, and online vehicles or rental cars on various platforms.

FIG. 1 is a schematic diagram of an overall composition principle of an active safety driver assistance system based on real-time driver state monitoring according to the present invention.

As shown in FIG. 1, the active safety driver assistance system is mainly composed of a driver state monitoring unit 200, an on-board gateway unit 300, an alarm prompt unit 400, a vehicle control unit 500, and a remote management unit 600 in cooperation.

The driver state monitoring unit 200 in the system is arranged in a cab of a to-be-monitored vehicle 100, is associated with the on-board gateway unit 300, the alarm prompt unit 400, and the vehicle control unit 500 of the vehicle, and is associated with the remote management unit 600 through the on-board gateway unit 300.

The driver state monitoring unit 200 may monitor a sentiment and/or a driving behavior and/or a physical fatigue state of a driver in real time, which may be transmitted to the remote management unit 600 for sentiment identification and/or behavior analysis and/or fatigue state determination through an edge computing module built in the state monitoring unit, an edge computing module of the on-board gateway unit 300, or a network communication module of the on-board gateway unit 300.

Moreover, the driver state monitoring unit 200 may be associated with the vehicle control unit 500 directly or with the vehicle control unit 500 through the on-board gateway unit 300 based on a real-time sentiment identification result and/or an abnormal behavior analysis result and/or a fatigue state determination result or based on a management command generated based on the relevant real-time sentiment identification result and/or abnormal behavior analysis result and/or fatigue state determination result obtained from the remote management unit through the on-board gateway unit, to control an operating state of an anti-lock (ABS) module, a speed limit management module, an intelligent brake management module, or an electronic brake assist (EBA) module to perform speed limit, speed control, or deceleration.

For example, the to-be-monitored vehicle 100 herein may be commercial vehicles such as those included in the term "two types of passenger vehicles, one type of hazardous goods vehicles, one type of freight vehicles, and one type of school vehicles", taxis, and online vehicles or rental cars on various platforms.

Figure 2:
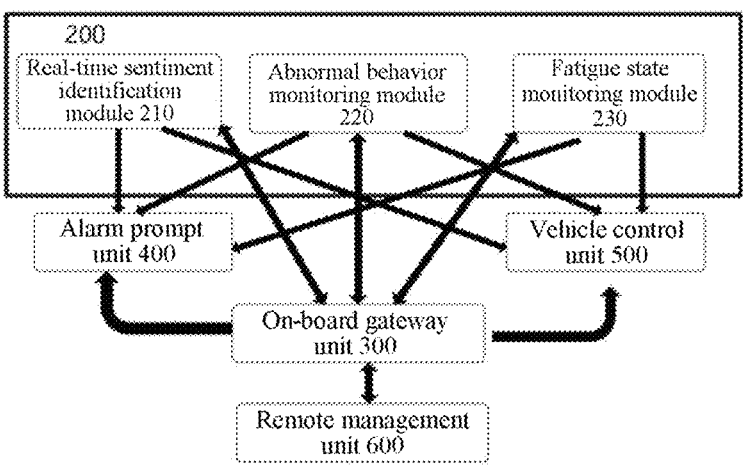
FIG. 2 is a schematic diagram of a composition principle and a usage process of a driver state monitoring unit of the active safety driver assistance system based on real-time driver state monitoring according to an embodiment of the present invention.

As shown in FIG. 2, the driver state monitoring unit 200 provided in this embodiment is composed of a real-time sentiment identification module 210 and/or an abnormal behavior monitoring module 220 and/or a fatigue state monitoring module 230 in combination with or independent of each other.

The real-time sentiment identification module 210 in the unit is configured to obtain a dynamic facial expression of a current driver, and transmit the obtained dynamic facial expression to an intelligent sentiment analysis function module thereof (such as the edge computing module built in the driver state monitoring unit 200) or an intelligent sentiment analysis function module of the on-board gateway unit (such as the edge computing module built in the on-board gateway unit), or to an intelligent sentiment analysis function module of the remote management unit through the on-board gateway unit.

The abnormal behavior monitoring module 220 in the unit is configured to obtain a face movement or a body movement of the current driver, and transmit the obtained face movement or body movement to an abnormal behavior analysis function module thereof (such as the edge computing module built in the driver state monitoring unit 200) or an abnormal behavior analysis function module of the on-board gateway unit (such as the edge computing module built in the on-board gateway unit), or to an abnormal behavior analysis function module of the remote management unit through the on-board gateway unit.

The fatigue state monitoring module 230 is configured to obtain fatigue state monitoring information of the current driver, and transmit the fatigue state monitoring information to a fatigue state determination function module thereof (such as the edge computing module built in the driver state monitoring unit 200) or a fatigue state determination module of the on-board gateway unit (such as the edge computing module built in the on-board gateway unit), or to a fatigue state determination module of the remote management unit through the on-board gateway unit.

The solution of using the edge computing module built in the driver state monitoring unit 200 is not limited herein and may be determined according to actual needs. For example, an edge computing module included in hardware of the driver state monitoring unit 200 hardware may be used for implementation.

As shown in FIG. 1 and FIG. 2, the driver state monitoring unit 200 arranged in this way acquires the dynamic facial expression of the current driver and/or performs intelligent analysis and identification based on the acquired dynamic facial expression through the real-time sentiment identification module 210, to determine a real-time sentimental state of the driver.

Through the abnormal behavior monitoring module 220, the driver state monitoring unit 200 may acquire head and face movements and a body movement and a pose of the current driver and/or perform intelligent analysis and identification a plurality of times based on the head and face movements acquired by a head and face video acquisition device and the body movement and the pose acquired by a panoramic body video acquisition device, to determine whether a real-time behavior state of the current driver is abnormal.

Through the fatigue state monitoring module 230, the driver state monitoring unit 200 may acquire a face movement of the current driver and/or perform intelligent analysis and identification based on the face movement acquired by the head and face video acquisition device, to determine a fatigue level of a real-time state of the current driver. Based on the above, intelligent analysis and identification may be further performed based on an acquired load distribution state of different points of a seat under the driver, to determine the real-time state of the fatigue level of the current driver. Alternatively, intelligent analysis and identification may be performed directly based on the load state of the different points of the seat under the driver acquired by a seat load acquisition device, to determine the fatigue level of the real-time state of the current driver.

When the driver state monitoring unit 200 performs intelligent analysis and identification, a corresponding edge computing module is built in the driver state monitoring unit 200 to perform the intelligent analysis and identification.

As an alternative, a corresponding edge computing module may be run in the on-board gateway unit 300 to perform the intelligent analysis and identification.

As another alternative, a corresponding edge computing module may be run in the remote management unit 600 to perform the intelligent analysis and identification.

In this way, during operation, the driver state monitoring unit 200 may transmit data monitored by a corresponding monitoring module to the remote management unit 600 for sentiment identification and/or behavior analysis and/or fatigue state determination through the edge computing module of the driver state monitoring unit 200, the edge computing module of the on-board gateway unit 300, or the network communication module of the on-board gateway unit 300.

The driver state monitoring unit 200 is further associated with the vehicle control unit 500 directly or with the vehicle control unit 500 through the on-board gateway unit 300 based on a real-time sentiment identification result and/or an abnormal behavior analysis result and/or a fatigue state determination result or based on a management command generated based on the relevant real-time sentiment identification result and/or abnormal behavior analysis result and/or fatigue state determination result obtained from the remote management unit 600 through the on-board gateway unit 300, to control an operating state of an anti-lock (ABS) module, a speed limit management module, an intelligent brake management module, or an electronic brake assist (EBA) module to perform speed limit, deceleration, or emergency braking, thereby controlling an operating state of the vehicle.

As shown in FIG. 1, the on-board gateway unit 300 in the system is arranged in a cab of the to-be-monitored vehicle 100, and is associated with the driver state monitoring unit 200, the alarm prompt unit 400, and the vehicle control unit 500, and the remote management unit 600 of the vehicle.

the on-board gateway unit 300 herein has a network communication function and/or a data storage function and/or an edge computing function and establishes a communication channel with the remote management unit 600 to identify and analyze data information generated by the driver state monitoring unit or transmit relevant information to the remote management unit for identification and analysis, and send management data information returned by the remote management unit to the vehicle control unit and the alarm prompt unit.

Figure 6:
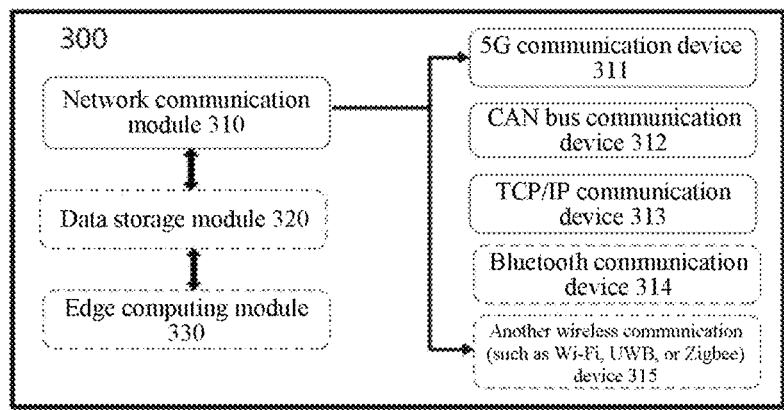
FIG. 6 is a schematic diagram of a composition principle of an on-board gateway unit and a network communication module thereof according to an embodiment of the present invention.

FIG. 6 is a schematic diagram of a composition principle of the on-board gateway unit 300 in the active safety driver assistance system based on real-time driver state monitoring and a network communication module thereof according to an embodiment.

As shown in FIG. 6, the on-board gateway unit 300 of the active safety driver assistance system provided in this embodiment is composed of a network communication module 310 and/or a data storage module 320 and/or an edge computing module 330 in combination with or independent of each other. The network communication module 310 is a basic composition, that is, a necessary composition of the on-board gateway unit 300.

As shown in FIG. 1 and FIG. 6, the on-board gateway unit 300 arranged in this way realizes data exchange between the driver state monitoring unit 200 and the alarm prompt unit 400, the vehicle control unit 500, and the remote management unit 600 by using the network communication module 310.

the on-board gateway unit 300 may forward, to the remote management unit 600 by using the network communication module 310, the dynamic facial expression information of the current driver and/or the head and face movement information and the body movement information of the current driver and/or the load distribution state information of the different points of the seat under the driver or a real-time sentiment analysis and identification result and/or an abnormal behavior analysis and identification result and/or a fatigue state determination result uploaded by the driver state monitoring unit 200. Correspondingly, the on-board gateway unit 300 may further send a corresponding command to the vehicle control unit 500 and the alarm prompt unit 400 based on the received real-time sentiment analysis and identification result and/or the abnormal behavior analysis and identification result and/or the fatigue state determination result, or send a corresponding command to the vehicle control unit 500 and the alarm prompt unit 400 based on the real-time sentiment analysis and identification result and/or the abnormal behavior analysis and identification result and/or the fatigue state determination result obtained by the edge computing module 330 of the on-board gateway unit 300, or forward a management command received from the remote management unit 600 to the driver state monitoring unit 200, the alarm prompt unit 400, or the vehicle control unit 500.

the on-board gateway unit 300 may store, by using the data storage module 320, the dynamic facial expression information of the current driver and/or the head and face movement information and the body movement and pose information of the current driver and/or the load distribution state information of the different points of the seat under the driver uploaded by the driver state monitoring unit 200.

the on-board gateway unit 300 may perform, by using the edge computing module 330, intelligent sentiment analysis and identification and/or abnormal behavior analysis and identification and/or fatigue state analysis and determination based on the dynamic facial expression information of the current driver and/or the head and face movement information and the body movement information of the current driver and/or the load distribution state information of the different points of the seat under the driver uploaded by the driver state monitoring unit 200.

As shown in FIG. 1, the alarm prompt unit 400 in the system is arranged in the cab of the to-be-monitored vehicle 100, on exterior of the vehicle, and in a monitoring client software of the remote management unit 600, and is associated with the driver state monitoring unit 200, the on-board gateway unit 300, and the remote management unit 600 of the vehicle.

The alarm prompt unit 400 herein includes a local acousto-optic alarm device or voice prompt device and a remote monitoring client alarm display device. The local acousto-optic alarm device or voice prompt device in the alarm prompt unit 400 is arranged in the cab of the transportation vehicle and on exterior of the vehicle and is connected to the driver state monitoring unit 200 and the on-board gateway unit 300. The local alarm prompt unit arranged in this way may send a voice prompt or an acousto-optic alarm based on a real-time sentiment state analysis result and a driving behavior analysis result of the driver sent by the driver state monitoring unit 200 or the on-board gateway unit 300.

The remote monitoring client alarm display device in the alarm prompt unit 400 is arranged in a government industry management client software, an enterprise operation management client software, and a driver and passenger service client software of the remote management unit, and is connected to the on-board gateway unit 300. The monitoring client of the alarm prompt unit arranged in this way sends a voice prompt or a text prompt based on a driver identity verification result or a driver state monitoring and determination result sent by the on-board gateway unit 300.

Figure 7:
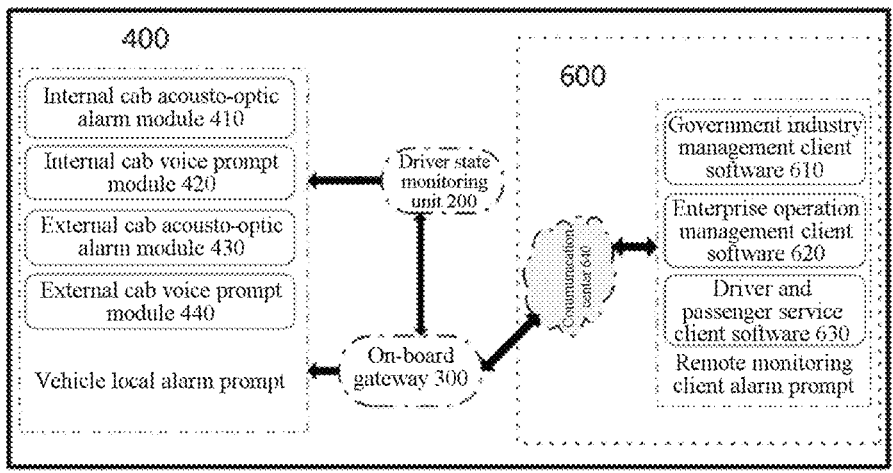
FIG. 7 is a schematic diagram of a composition principle and a usage process of an alarm prompt unit according to an embodiment of the present invention.

FIG. 7 is a schematic diagram of a composition principle and a usage process of the alarm prompt unit 400 of the active safety driver assistance system according to an embodiment.

As shown in FIG. 7, the alarm prompt unit 400 of the active safety driver assistance system provided in this embodiment is composed of vehicle local alarm prompt subunits such as an internal cab acousto-optic alarm module 410, an internal cab voice prompt module 420, an external cab acousto-optic alarm module 430, and an external cab voice prompt module 440 and remote monitoring client software alarm prompt subunits such as a government industry management client software 610, an enterprise operation management client software 620, and a driver and passenger service client software 630, which are in cooperation with each other.

As shown in FIG. 1 and FIG. 7, the internal cab acousto-optic alarm module 410 of the alarm prompt unit 400 arranged in this way is configured to send an acousto-optic alarm when a sentiment identification result of the driver is abnormal, an abnormal behavior occurs, and a fatigue state determination result is abnormal. For example, the light emitted by the acousto-optic alarm device of the acousto-optic alarm module is generally red by default.

The internal cab voice prompt module 420 is configured to: prompt the driver to adjust a sentiment or stop nearby when the sentiment identification result of the driver is abnormal, prompt the driver to correct an unsafe driving behavior when the driver has an abnormal behavior, and prompt the driver to concentrate on the driving or stop nearby when the fatigue state determination result is abnormal. For example, the internal cab voice prompt module 420 herein may be arranged independently of the internal cab acousto-optic alarm module or combined with the internal cab acousto-optic alarm module into an acousto-optic alarm device.

The external cab acousto-optic alarm module 430 is configured to send an acousto-optic alarm to crows outside the vehicle when the sentiment identification result of the driver is significantly abnormal, an abnormal behavior that will cause a serious risk occurs, and the fatigue state determination result is significantly abnormal. For example, the light emitted by the acousto-optic alarm device of the acousto-optic alarm module herein is generally red by default, and the alarm sound is loud enough so that passersby can become alert even in a noisy road environment.

The external cab voice prompt module cab 440 is configured to send a voice prompt to crows outside the vehicle when the sentiment identification result of the driver is significantly abnormal, an abnormal behavior that will cause a serious risk occurs, and the fatigue state determination result is significantly abnormal. For example, the voice prompt generated by the external cab voice prompt module cab 440 is loud enough so that passersby can become highly alert even in a noisy road environment, and content of the voice alarm is broadcast clearly enough so that listeners can clearly understand the content.

The government industry management client software 610 is configured to receive alarm information forwarded by the on-board gateway unit through the communication center when the sentiment identification result of the driver is abnormal, an abnormal behavior occurs, and the fatigue state determination result is abnormal. For example, the government industry management client software starts an emergency management process by default according to an emergency plan when receiving information indicating that the sentiment identification result of the driver is significantly abnormal, an abnormal behavior that will cause a serious travelling risk occurs, and the fatigue state determination result is significantly abnormal.

The enterprise operation management client software 620 is configured to receive alarm information forwarded by the on-board gateway unit through the communication center when the sentiment identification result of the driver is abnormal, an abnormal behavior occurs, and the fatigue state determination result is abnormal. For example, the enterprise operation management client software 620 starts an emergency management process by default according to an emergency plan and synchronously sends emergency alarm information to the government industry management client when receiving information indicating that the sentiment identification result of the driver is significantly abnormal, an abnormal behavior that will cause a serious travelling risk occurs, and the fatigue state determination result is significantly abnormal.

The driver and passenger service client 630 is configured to: receive alarm information forwarded by the on-board gateway unit through the communication center when the sentiment identification result of the driver is abnormal, an abnormal behavior occurs, and the fatigue state determination result is abnormal, and send a voice prompt with set content depending on different user roles of the driver and passenger service client to prompt the driver to adjust a pose for re-verification, or prompt the driver to adjust a sentiment or correct an unsafe driving behavior, or prompt the driver to concentrate on the driving or park nearby when sending the alarm information. For example, the driver and passenger service client herein sends a voice prompt while sending the alarm information. Content of the voice prompt varies depending on a role of a user of the driver and passenger service client, for example, may be prompting, by the driver and passenger service client, the driver to adjust the sentiment or correct the unsafe driving behavior, or prompting the driver to concentrate on the driving or stop nearby. A hazardous chemical transportation vehicle escort service client prompts, through a voice, an escort to supervise the driver to adjust the sentiment, correct the unsafe driving behavior, or prompt the driver to concentrate on the driving, or stop nearby, or the like.

As shown in FIG. 1, the vehicle control unit 500 in the system is arranged in the cab of the to-be-monitored vehicle 100, and is associated with the driver state monitoring unit 200, the on-board gateway unit 300, and the remote management unit 600 of the vehicle.

The vehicle control unit 500 is arranged in the cab of the vehicle or an engine compartment of the vehicle, linked to a starting system, a speed control system, and a braking system of the vehicle, associated with the on-board gateway unit 300 and the driver state monitoring unit 200, and associated with the alarm prompt unit 400, the remote management unit 600, and/or the driver state monitoring unit 200 through the on-board gateway unit 300.

The vehicle control unit 500 may or not control the vehicle to perform speed limit, deceleration, or emergency braking depending on a real-time sentimental state analysis result, a driving behavior analysis result, and the fatigue state determination result of the driver sent by the driver state monitoring unit 200 or the on-board gateway unit 300.

Figure 8:
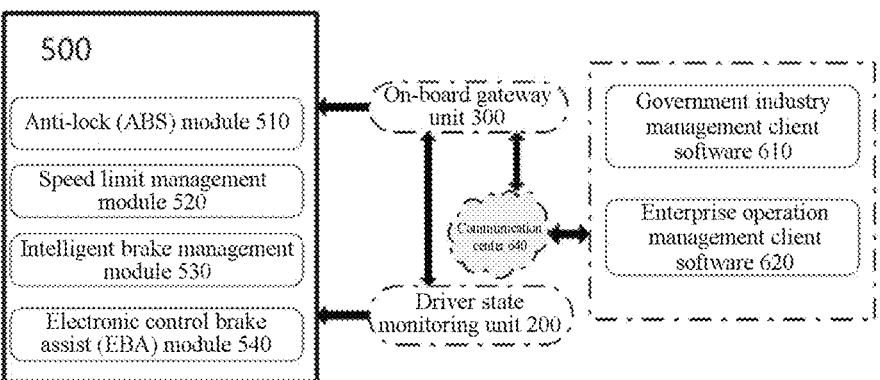
FIG. 8 is a schematic diagram of a composition principle and a usage process of a vehicle control unit according to an embodiment of the present invention.

FIG. 8 is a schematic diagram of a composition principle and a usage process of the vehicle control unit 500 of the active safety driver assistance system according to an embodiment.

As shown in FIG. 8, the vehicle control unit 500 provided in this embodiment is composed of an anti-lock (ABS) module 510 and/or a speed limit management module 520 and/or an intelligent brake management module 530 and/or an electronic brake assist (EBA) module 540 in combination with or independent of each other.

As shown in FIG. 1 and FIG. 8, by using the anti-lock (ABS) module 510, the vehicle control unit 500 arranged in this way may receive an abnormal driver state monitoring result sent by the driver state monitoring unit 200 or forwarded by the driver state monitoring unit 200 through the on-board gateway unit 300 or forwarded by the enterprise operation management client software 610 through a communication center 640 and the on-board gateway unit 300, and prevent possible travelling direction runaway or sideslip of the vehicle during emergency braking.

By using the speed limit management module 520, the vehicle control unit 500 may receive the abnormal driver state monitoring result sent by the driver state monitoring unit 200 or forwarded by the driver state monitoring unit 200 through the on-board gateway unit 300 or forwarded by the enterprise operation management client software 610 through the communication center 640 and the on-board gateway unit 300, and control a maximum travelling speed of the vehicle.

By using the intelligent brake management module 530, the vehicle control unit 500 may receive the abnormal driver state monitoring result sent by the driver state monitoring unit 200 or forwarded by the driver state monitoring unit 200 through the on-board gateway unit 300 or forwarded by the enterprise operation management client software 610 through the communication center 640 and the on-board gateway unit 300, and start an intelligent braking device to reduce a real-time traveling speed of the vehicle.

By using the electronic brake assist (EBA) module 540, the vehicle control unit 500 may receive the abnormal driver state monitoring result sent by the driver state monitoring unit 200 or forwarded by the driver state monitoring unit 200 through the on-board gateway unit 300 or forwarded by the enterprise operation management client software 610 through the communication center 640 and the on-board gateway unit 300, and quickly start a full braking force for emergency braking to prevent a traffic accident resulted from an excessively large braking distance caused by a slow response of the driver in the abnormal state.

The vehicle control unit 500 is preferably directly associated with the driver state monitoring unit 200 and the on-board gateway unit 300 during deployment for application. In this way, when the vehicle control unit 500 receives the abnormal driver state detection result, the vehicle control unit controls the vehicle to perform speed limit, deceleration, or emergency braking, thereby achieving different types of precise control for the vehicle in different cases, and thus effectively ensuring traveling safety of the vehicle.

As shown in FIG. 1, the remote management unit 600 in the system is arranged on a cloud platform of a vehicle transportation-related government industry administration department and/or a local storage server and/or a personal handheld intelligent terminal of a relevant management person, a cloud platform of a transportation enterprise to which the vehicle belongs and a transportation-related party and/or a local storage server and/or a personal handheld intelligent terminal of a relevant management person, and a personal handheld intelligent terminal of a driver and passenger, is associated with the on-board gateway unit 300, and is associated with the driver state monitoring unit 200, the alarm prompt unit 400, and the vehicle control unit 500 through the on-board gateway unit 300.

During operation, the remote management unit 600 receives a real-time sentiment identification result and/or an abnormal driving behavior analysis result and/or a fatigue state determination result of the driver sent by the on-board gateway unit 300, provides a vehicle and driver management control command based on the sentiment identification result and/or the abnormal behavior analysis result and/or the fatigue state determination result, feeds aback the vehicle and driver management control command to the on-board gateway unit 300 and to the alarm prompt unit 400 or the vehicle control unit 500 through an on-board gateway unit, and sends an acousto-optic alarm or a voice prompt to control a vehicle ACC to enable or disable or control the vehicle to perform speed limit, deceleration, or emergency braking.

Figure 9:
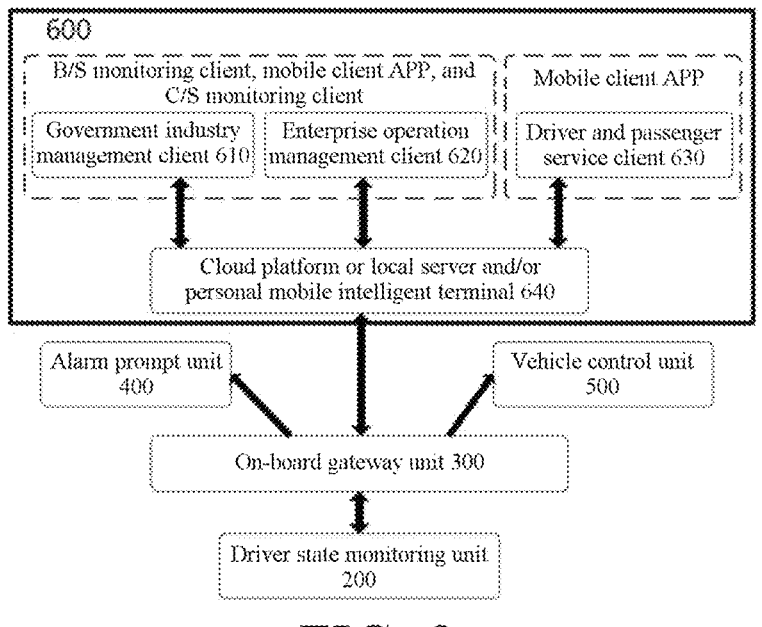
FIG. 9 is a schematic diagram of a composition principle and a usage process of a remote management unit according to an embodiment of the present invention.

FIG. 9 is a schematic diagram of a composition principle and a usage process of the remote management unit 600 of the active safety driver assistance system according to an embodiment.

As shown in FIG. 9, the remote management unit 600 provided in this embodiment is composed of the government industry management client unit 610, the enterprise operation management client unit 620, the driver and passenger service client unit 630, and the communication center 640 (for example, a cloud platform or a local server and/or a personal mobile intelligent terminal) in cooperation with each other.

As shown in FIG. 1 and FIG. 9, by using the government industry management client software 610, the remote management unit 600 arranged in this way may receive and display the driver state monitoring result forwarded by the driver state monitoring unit 200 through the on-board gateway unit 300 and the communication center 640, send a relevant management command for managing the driver based on the received driver state monitoring result, and start an emergency management process and issue a relevant emergency response command when the driver state monitoring result shows a significant abnormality.

By using the enterprise operation management client software 620, the remote management unit 600 may receive and display the driver state monitoring result sent by the driver state monitoring unit 200 or forwarded by the driver state monitoring unit 200 through the on-board gateway unit 300 and the communication center 640, send a relevant management command for managing the driver based on the received driver state monitoring result, and start an emergency management process, send an emergency alarm to the government industry management client, and issue a relevant emergency response command when the received driver state monitoring result shows a significant abnormality.

By using the driver and passenger service client unit 630, the remote management unit 600 may receive and display the driver state monitoring result sent by the driver state monitoring unit 200 or forwarded by the driver state monitoring unit 200 through the on-board gateway unit 300 and the communication center 640, and issue a relevant alarm prompt based on the received driver state monitoring result.

By using the communication center 640, the remote management unit 600 may communicate with the on-board gateway unit 300, and receive and store the dynamic facial expression information of the current driver acquired by the high-speed face photographing device in the real-time sentiment identification module 210 in the driver state monitoring unit 200, the head and face movement information and the body movement and pose information of the current driver respectively acquired by the head and face video acquisition device and the panoramic body video acquisition device in the abnormal behavior monitoring module 220, the head and face movement information of the current driver acquired by the head and face video acquisition device in the fatigue state monitoring module 230 and the load state information of the different points of the seat under the driver acquired by the seat load state acquisition device, or the driver state monitoring result forwarded by the driver state monitoring unit 200 through the on-board gateway unit 300. When an abnormal behavior analysis and identification component, a video analysis-based fatigue state analysis component, or a sensor network analysis-based fatigue state analysis component is arranged on the remote management unit 600, intelligent sentiment analysis and identification, abnormal behavior analysis and identification, or fatigue state analysis and determination may be performed through a cloud platform or a local server of the communication center 640.

The communication center 640 is further used as a computer system environment for the government industry management client unit 610, the enterprise operation management client unit 620, and the driver and passenger service client unit 630, supports a relevant software application, and forwards a management command or a response command of the government industry management client software 610, the enterprise operation management client software 620, and the driver and passenger service client software 630 to the on-board gateway unit 300.

Based on the above, an embodiment further clearly provides a specific device of a constituent module of each unit in the active safety driver assistance system based on real-time driver state monitoring.

Figure 3:
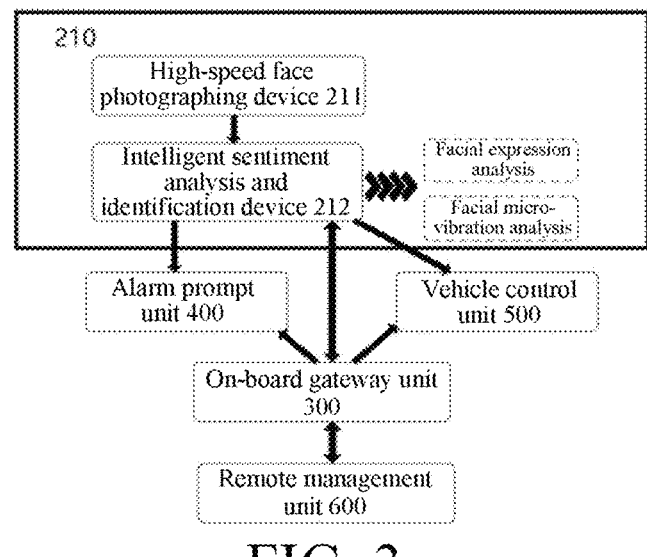
FIG. 3 is a schematic diagram of a composition principle and a usage process of a sentiment identification module of the driver state monitoring unit according to an embodiment of the present invention.

FIG. 3 is a schematic diagram of a composition principle and a usage process of the real-time sentiment identification module 210 in the driver state monitoring unit 200 of the active safety driver assistance system according to an embodiment.

As shown in FIG. 3, the real-time sentiment identification module 210 in the driver state monitoring unit 200 of the active safety driver assistance system includes a high-speed face photographing device 211 and an intelligent sentiment analysis and identification device 212.

The high-speed face photographing device 211 herein is configured to acquire the dynamic facial expression of the current driver. The high-speed face photographing device 211 includes but is not limited to an external high-speed video acquisition camera and a built-in high-speed video acquisition camera. A type of the high-speed face photographing device includes but is not limited to a visible light high-speed video acquisition camera, a near-infrared high-speed video acquisition camera, a dedicated high-speed camera for acquiring a three-dimensional the dynamic facial expression state, or a high-speed instrument for acquiring a three-dimensional dynamic facial expression, which may be specifically determined based on a mounting condition for the vehicle and a management requirement of a carrier, and is not limited herein.

The intelligent sentiment analysis and identification device 212 is configured to perform intelligent analysis and identification based on the dynamic facial expression acquired by the high-speed face photographing device 211, and determine a real-time sentimental state of the current driver. A type of the intelligent sentiment analysis and identification device includes but is not limited to an intelligent sentiment analysis and identification component inside the driver state monitoring unit, an intelligent sentiment analysis and identification component inside the on-board gateway unit, and an intelligent sentiment analysis and identification component inside the remote management unit. In addition, the type of the intelligent sentiment analysis and identification device includes but is not limited to a facial expression analysis device or a micro-expression analysis device and a facial micro-vibration analysis device depending on different technical principles, which may be specifically determined based on a mounting condition for the vehicle and a management requirement of a carrier, and is not limited herein.

Figure 4:
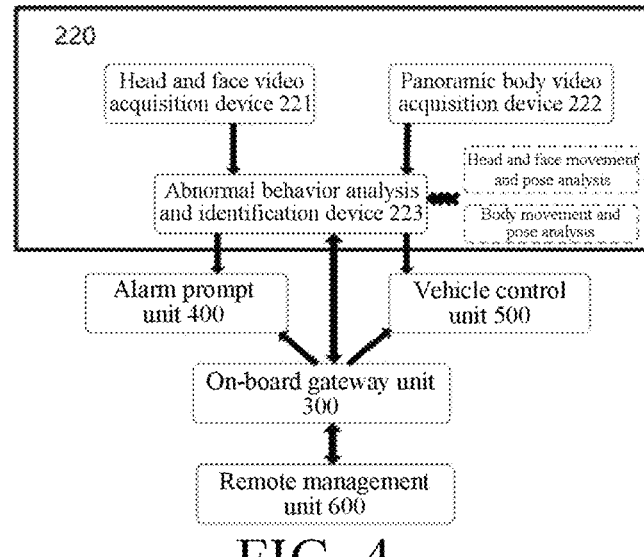
FIG. 4 is a schematic diagram of a composition principle and a usage process of an abnormal behavior monitoring module of the driver state monitoring unit according to an embodiment of the present invention.

Further, FIG. 4 is a schematic diagram of a composition principle and a usage process of the abnormal behavior monitoring module 220 in the driver state monitoring unit 200 of the active safety driver assistance system according to an embodiment.

As shown in FIG. 4, the abnormal behavior monitoring module 220 in the driver state monitoring unit 200 of the active safety driver assistance system provided in this embodiment includes a head and face video acquisition device 221, a panoramic body video acquisition device 222, and an abnormal behavior analysis and identification device 223.

The head and face video acquisition device 221 is configured to acquire head and face movements of the current driver. The head and face video acquisition device 221 includes but is not limited to an external video acquisition camera and a built-in video acquisition camera, and a type of the head and face video acquisition device 221 includes but is not limited to a visible light video acquisition camera and a near-infrared video acquisition camera, which may be specifically determined based on a mounting condition for the vehicle and a management requirement of a carrier, and is not limited herein.

The panoramic body video acquisition device 222 is configured to acquire a body movement and a pose of the current driver. The panoramic body video acquisition device 222 includes but is not limited to an external video acquisition camera and a built-in video acquisition camera, and a type of the panoramic body video acquisition device includes but is not limited to a visible light video acquisition camera and an infrared video acquisition camera, which may be specifically determined based on a mounting condition for the vehicle and a management requirement of a carrier, and is not limited herein.

The abnormal behavior analysis and identification device 223 is configured to perform intelligent analysis and identification based on the head and face movements acquired by the head and face video acquisition device 221 and the body movement and the pose acquired by the panoramic body video acquisition device 222, to determine whether a real-time behavior state of the current driver is abnormal. The abnormal behavior analysis and identification device 223 includes but is not limited to an abnormal behavior analysis and identification component inside the driver state monitoring unit, an abnormal behavior analysis and identification component inside the on-board gateway unit, and an abnormal behavior analysis and identification component inside the remote management unit. In addition, a type of the abnormal behavior analysis and identification device includes a head and face movement analysis device or a body movement and pose analysis device, which may be specifically determined based on a mounting condition for the vehicle and a management requirement of a carrier, and is not limited herein.

Figure 5:
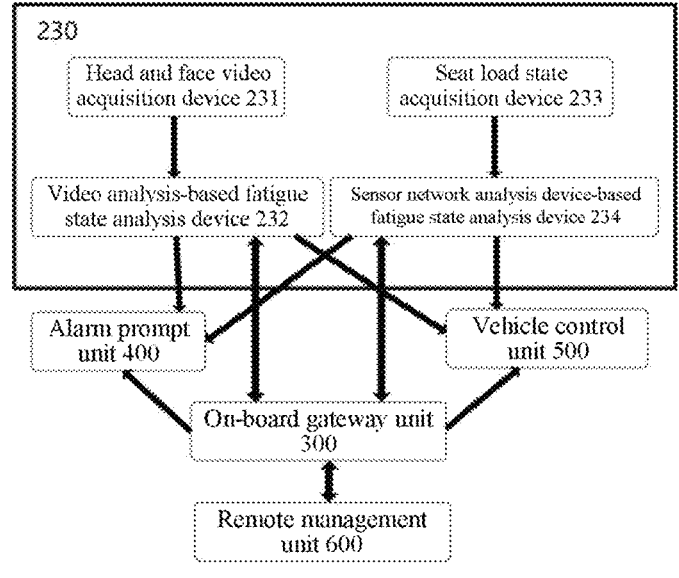
FIG. 5 is a schematic diagram of a composition principle and a usage process of a fatigue state monitoring module of the driver state monitoring unit according to an embodiment of the present invention.

Further, FIG. 5 is a schematic diagram of a composition principle and a usage process of the fatigue state monitoring module 230 in the driver state monitoring unit 200 of the active safety driver assistance system according to an embodiment.

As shown in FIG. 5, the fatigue state monitoring module 230 in the driver state monitoring unit 200 of the active safety driver assistance system provided in this embodiment includes a head and face video acquisition device 231, a video analysis-based fatigue state analysis device 232, a seat load state acquisition device 233, and a sensor network analysis-based fatigue state analysis device 234.

The head and face video acquisition device 231 is configured to acquire head and face movements of the current driver. The head and face video acquisition device includes but is not limited to an external video acquisition camera and a built-in video acquisition camera, and a type of the head and face video acquisition device includes but is not limited to a visible light video acquisition camera and a near-infrared video acquisition camera, which may be specifically determined based on a mounting condition for the vehicle and a management requirement of a carrier, and is not limited herein.

The video analysis-based fatigue state analysis device 232 is configured to perform intelligent analysis and identification based on the head and face movements acquired by the head and face video acquisition device 231, to determine a fatigue degree of the real-time state of the current driver. The video analysis-based fatigue state analysis device includes but is not limited to a video analysis-based fatigue state analysis and identification component inside the driver state monitoring unit, a video analysis-based fatigue state analysis and identification component inside the on-board gateway unit, and a video analysis-based fatigue state analysis and identification component inside the remote management unit, which may be specifically determined based on a mounting condition for the vehicle and a management requirement of a carrier, and is not limited herein.

The seat load state acquisition device 233 is configured to acquire a load distribution of different points of a seat under the driver. The seat load state acquisition device includes but is not limited to a pressure sensor on an external cushion laying on a seat and on a backrest and a built-in pressure sensor inside the seat, and a type of the seat load state acquisition device includes but is not limited to a piezoelectric sensor, a piezoresistive sensor, and a strain sensor depending on different technical principles, which may be specifically determined based on a mounting condition for the vehicle and a management requirement of a carrier, and is not limited herein.

The sensor network analysis-based fatigue state analysis device 234 is configured to perform intelligent analysis and identification based on the load state of the different points of the seat under the driver acquired by the seat load state acquisition device 233, and determine a fatigue degree of the real-time state of the current driver; The sensor network analysis-based fatigue state analysis device 234 includes but is not limited to a sensor network analysis-based fatigue state analysis and identification component inside the driver state monitoring unit, a sensor network analysis-based fatigue state analysis and identification component inside the on-board gateway unit, and a sensor network analysis-based fatigue state analysis and identification component inside the remote management unit, which may be specifically determined based on a mounting condition for the vehicle and a management requirement of a carrier, and is not limited herein.

Accordingly, during deployment, the driver state monitoring unit 200 composed of the real-time sentiment identification module 210, the abnormal behavior monitoring module 220, and the fatigue state monitoring module 230 in cooperation with each other may be directly associated with the vehicle control unit 500 or indirectly associated with the vehicle control unit 500 and/or the remote management unit 600 through the on-board gateway unit 300.

When the driver state monitoring unit 200 is directly associated with the vehicle control unit 500, and the real-time sentiment identification result and/or the abnormal behavior monitoring result and/or the fatigue state monitoring result of the driver reaches or exceeds a danger threshold, the vehicle control unit 500 controls the vehicle to perform speed limit, deceleration, or emergency braking, and the alarm prompt unit sends an alarm prompt of a dangerous state or a dangerous behavior, and the analysis, identification or determination result and an action state of the vehicle control unit are uploaded to the remote management unit 600 through the on-board gateway unit 300.

When the driver state monitoring unit 200 is indirectly associated with the vehicle control unit 500 through the on-board gateway unit 300, after the real-time sentiment identification result and/or the abnormal behavior monitoring result and/or the fatigue state monitoring result of the driver reaches or exceeds the danger threshold, the on-board gateway unit 300 sends a command to the vehicle control unit 500, so that the vehicle control unit 500 controls the vehicle to perform speed limit, deceleration, or emergency braking, and the alarm prompt unit sends an alarm prompt of a dangerous state or a dangerous behavior, and the analysis, identification or determination result and the action state of the vehicle control unit 500 are uploaded to the remote management unit 600 through the on-board gateway unit 300.

When the driver state monitoring unit 200 is indirectly associated with the vehicle control unit 500 through the on-board gateway unit 300, but the video analysis-based fatigue state analysis component or the sensor network analysis-based fatigue state analysis component is in the remote management unit 600, the dynamic facial expression information of the current driver acquired by the high-speed face photographing device in the real-time sentiment identification module 210 in the driver state monitoring unit 200, the head and face movement information and the body movement and pose information of the current driver respectively acquired by the head and face video acquisition device and the panoramic body video acquisition device in the abnormal behavior monitoring module 220, the head and face movement information of the current driver acquired by the head and face video acquisition device and the load state information of the different points of the seat under the driver acquired by the seat load state acquisition device in the fatigue state monitoring module 230 are uploaded to the remote management unit 600 through the on-board gateway unit 300. The remote management unit 600 performs intelligent analysis, identification, or determination, and returns an analysis identification, or determination result to the on-board gateway unit 300. The on-board gateway unit 300 sends a command to the vehicle control unit 500. The vehicle control unit 500 controls the vehicle to perform speed limit, deceleration, or emergency braking, and the alarm prompt unit 400 sends an alarm prompt of a dangerous state or a dangerous behavior. The action state of the vehicle control unit 500 is uploaded to the remote management unit through the on-board gateway unit.

FIG. 6 is a schematic diagram of a composition principle of the on-board gateway unit 300 in the active safety driver assistance system and a network communication module thereof according to an embodiment.

As shown in FIG. 6, the network communication module 310 in the on-board gateway unit 300 of the active safety driver assistance system provided in this embodiment is composed of a 5G communication device 311, a CAN bus communication device 312, a TCP/IP communication device 313, a Bluetooth communication device 314, another wireless communication device 315 (Wi-Fi, UWB, Zigbee, or the like), and the like in combination with each other.

The network communication module 310 may realize communication between the on-board gateway unit 300 and the remote management unit 600 by using the 5G communication device 311.

The network communication module 310 may realize CAN-based wired communication between the on-board gateway unit 300 and the driver state monitoring unit 200, the alarm prompt unit 400, and the vehicle control unit 500 by using the CAN bus communication device 312.

The network communication module 310 may realize TCP/IP-based wired or wireless communication between the on-board gateway unit 300 and the driver state monitoring unit 200, the alarm prompt unit 400, the vehicle control unit 500, and the remote management unit 600 by using the TCP/IP communication device 313.

The network communication module 310 may realize Bluetooth protocol-based wireless communication between the on-board gateway unit 300 and the driver state monitoring unit 200 and the alarm prompt unit 400 by using the Bluetooth communication device 314.

The network communication module 310 may realize wireless communication based on a corresponding protocol such as Wi-Fi, UWB, or Zigbee between the on-board gateway unit 300 and the driver state monitoring unit 200 and the alarm prompt unit 400 by using the another wireless communication device 315 (Wi-Fi, UWB, Zigbee, or the like).

In a preferred solution, the network communication module 310 in this embodiment has at least three communication devices such as the 5G communication device 311, the CAN bus communication device 312, and the TCP/IP communication device 313. Arrangement of another wireless communication devices is determined based on a specific communication way of a camera, a sensor, a certificate acquisition device, and a biometric information acquisition device mounted in the vehicle, and is not limited herein.

As shown in FIG. 6, the data storage module 320 in the on-board gateway unit 300 of the active safety driver assistance system provided in this embodiment includes a built-in data storage device and an external data storage device.

The built-in data storage device is configured to store the dynamic facial expression information of the current driver and/or the head and face movement information and the body movement and pose information of the current driver and/or the load distribution state information of the different points of the seat under the driver uploaded by the driver state monitoring unit. The built-in data storage device specifically includes but is not limited to a built-in static random access memory (SRAM), a built-in dynamic random access memory (DRAM), a built-in hard disk, and a built-in read-only memory (ROM).

The external data storage device includes but is not limited to an external mobile hard disk drive, an USB flash drive, a TF memory card, an SD memory card, a rewritable CD-RW, a DVD-RAM disk, a non-rewritable CD-ROM, and a DVD-ROM disk.

As shown in FIG. 6, the edge computing module 330 in the on-board gateway unit 300 of the active safety driver assistance system provided in this embodiment includes an AI smart chip with an edge computing function and a terminal SDK with an edge computing function.

The circuit board AI smart chip with the edge computing function and the terminal SDK with the edge computing function are configured to perform intelligent sentiment analysis and identification and/or abnormal behavior analysis and identification and/or fatigue state analysis and determination based on the dynamic facial expression information of the current driver and/or the head and face movement information and the body movement and pose information of the current driver and/or the load distribution state information of the different points of the seat under the driver uploaded by the driver state monitoring unit.

Accordingly, during specific deployment, the on-board gateway unit 300 composed of the network communication module 310, the data storage module 320, and the edge computing module 330 in cooperation with each other may be directly associated with the driver state monitoring unit 200, the vehicle control unit 500, the alarm prompt unit 400, and the remote management unit 500.

When the on-board gateway unit 300 receives an abnormal driver state detection result, the on-board gateway unit 300 sends a command to the vehicle control unit 500 to control the vehicle to perform speed limit, deceleration, or emergency braking, sends a dangerous state or dangerous behavior alarm to the alarm prompt unit 400, and sends a voice prompt to prompt the driver to eliminate an abnormal sentiment and an abnormal behavior or prompt the driver to stop and rest nearby, and forwards the driver state monitoring result and the action information of the vehicle control unit to the remote management unit 600.

When the video analysis-based fatigue state analysis component or the sensor network analysis-based fatigue state analysis component is in the remote management unit 600, the on-board gateway unit 300 forwards, to the remote management unit 600, the dynamic facial expression information of the current driver acquired by the high-speed face photographing device, the head and movement information and the body movement and pose information of the current driver respectively acquired by the head and face video acquisition device and the panoramic body video acquisition device, the head and face movement information of the current driver acquired by the head and face video acquisition device, and the load state information of the different points of the seat under the driver acquired by the seat load state acquisition device, and the remote management unit 600 performs intelligent analysis, identification, or determination and then sends an analysis, identification, or determination result and a command to the vehicle control unit 500 and/or the alarm prompt unit 400, and then the action state of the vehicle control unit is uploaded to the remote management unit 600.

Further, as shown in FIG. 7, during specific deployment, the alarm prompt unit 400 in this embodiment may be directly associated with the driver state monitoring unit 200 and the on-board gateway unit 300.

When the vehicle local alarm prompt subunit receives an abnormal sentiment identification result of the driver, an abnormal behavior monitoring result, or an abnormal fatigue state monitoring result sent by the driver state monitoring unit 200 or sent by the driver state monitoring unit 200 through the on-board gateway unit 300, the alarm prompt unit 400 sends an acousto-optic alarm and prompts, through a voice, the driver to adjust a sentiment, correct an unsafe driving behavior, concentrate on the driving, or stop nearby.

When the vehicle local alarm prompt subunit receives a significantly abnormal sentiment identification result of the driver, a significantly abnormal behavior monitoring result, or a significantly abnormal fatigue state monitoring result sent by the driver state monitoring unit 200 or sent by the driver state monitoring unit 200 through the on-board gateway unit 300, the alarm prompt unit 400 sends an acousto-optic alarm inside and outside the vehicle, prompts, through a voice inside and outside the vehicle, the driver to adjust the sentiment, correct the unsafe driving behavior, concentrate on the driving, or stop nearby, and prompts passersby to be alert to the abnormal vehicle, go away from the vehicle in time, or immediately call the police.

When the remote monitoring client software alarm prompt subunit receives the abnormal sentiment identification result, the abnormal behavior monitoring result, or the abnormal fatigue state monitoring result sent by the driver state monitoring unit 200 through the on-board gateway unit 300 and the communication center, the alarm prompt unit 400 sends an alarm prompt or a voice prompt.

When the remote monitoring client software alarm prompt subunit receives the significantly abnormal sentiment identification result of the driver, the significantly abnormal behavior monitoring result, and the significantly abnormal fatigue state monitoring result sent by the driver state monitoring unit 200 through the on-board gateway unit 300 and the communication center, the alarm prompt unit 400 sends an emergency alarm and a voice prompt, and starts an emergency management process according to the emergency plan by default.

Figure 10:
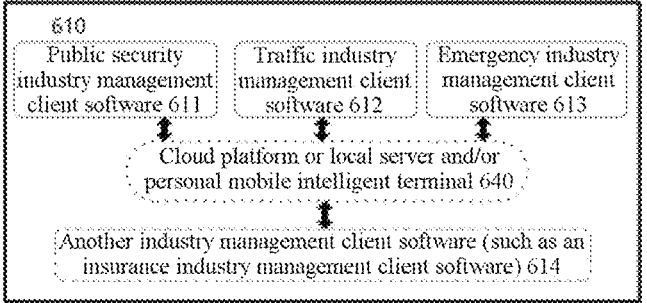
FIG. 10 is a schematic diagram of a composition principle of a government industry management client of the remote management unit according to an embodiment of the present invention.

Further, FIG. 10 is a schematic diagram of a composition principle of the government industry management client 610 of the remote management unit of the active safety driver assistance system according to an embodiment.

As shown in FIG. 10, the government industry management client 610 of the remote management unit 600 of the active safety driver assistance system provided this embodiment includes a public security industry management client software 611, a traffic industry management client software 612, an emergency industry management client software 613, and another industry management client software 614 (such as an insurance industry management client software) depending on different industry administration departments.

The public security industry management client software 611 in the government industry management client 610 is configured for abnormal driver behavior and fatigue state monitoring and alarm, driver archive management, and driver behavior evaluation.

Through the abnormal driver behavior and fatigue state monitoring and alarm, monitoring and alarm information of an abnormal sentiment, an abnormal behavior, and a fatigue state of the driver may be received and displayed. When a high-risk alarm is received, warning information is sent to the enterprise operation management client and the driver and passenger service client in the form of a text, an image, a voice, a file, or the like, and linkage management information is sent according to the set emergency plan. Through the driver archive management, an archive of the driver may be managed. Content of the archive management includes a name, a gender, an ID number, a company name, a motor vehicle driving license number and a validity, and a personnel category. The driver behavior evaluation supports driver behavior evaluation based on relevant information such as different alarm types, alarm numbers, and alarm levels.

The traffic industry management client software 612 in the government industry management client 610 is configured for abnormal driver behavior and fatigue state monitoring and alarm, driver and passenger archive management, and driver behavior evaluation.

Through the abnormal driver behavior and fatigue state monitoring and alarm, monitoring and alarm information of an abnormal sentiment, an abnormal behavior, and a fatigue state of the driver may be received and displayed. When a high-risk alarm is received, warning information is sent to the enterprise operation management client and the driver and passenger service client in the form of a text, an image, a voice, a file, or the like, and linkage management information is sent according to the set emergency plan. Through the driver and passenger archive management, archives of a driver and a passenger such as the driver or an escort of a hazardous chemicals transportation vehicle may be managed. Content of the archive management includes a name, a gender, an ID number, a company name, a qualification certificate number, a qualification certificate validity, and a personnel category.

The driver behavior evaluation supports driver behavior evaluation based on relevant information such as different alarm types, alarm numbers, and alarm levels.

The emergency industry management client software 613 in the government industry management client 610 is configured for abnormal driver behavior and fatigue state monitoring and alarm. Through the abnormal driver behavior and fatigue state monitoring and alarm, monitoring and alarm information of an abnormal sentiment, an abnormal behavior, and a fatigue state of the driver may be received and displayed. When a high-risk alarm is received, warning information is sent to the enterprise operation management client and the driver and passenger service client in the form of a text, an image, a voice, a file, or the like, and linkage management information is sent according to the set emergency plan.

The another industry management client software 614 (such as an insurance industry management client software) in the government industry management client 610 is configured for driver behavior evaluation and the like. Through the driver behavior evaluation, an unsafe driving behavior result of the driver and the passenger may be received, and recording and querying may be performed.

The another industry management client software further supports function customization based on a corresponding industry management demand or independent enable or disable of a relevant monitoring client function within a user permission range, which is not limited herein.

Figure 11:
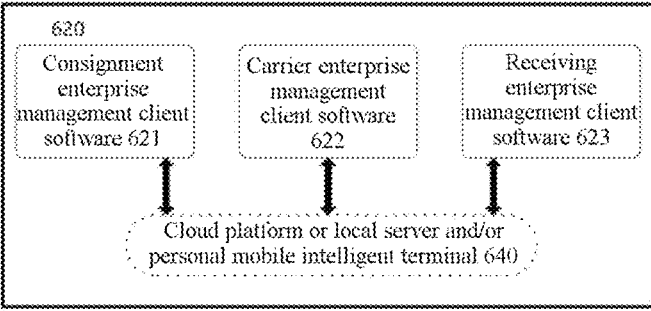
FIG. 11 is a schematic diagram of a composition principle of an enterprise operation management client of the remote management unit according to an embodiment of the present invention.

FIG. 11 is a schematic diagram of a composition principle of the enterprise operation management client 620 of the remote management unit of the active safety driver assistance system according to an embodiment.

As shown in FIG. 11, the enterprise operation management client 620 of the remote management unit 600 of the active safety driver assistance system provided in this embodiment includes a consigner management client software 621, a carrier management client software 622, and a receiver management client software 623 depending on different users. For a non-freight commercial vehicle, merely the carrier management client software 622 may be retained.

The consigner management client software 621 of the enterprise operation management client 620 is configured for driver identity information querying. For example, when used in a hazardous goods transportation vehicle, the software supports querying of identity information, a qualification certificate, and a current transportation identity verification result of a current transportation driver or an escort of the hazardous goods transportation vehicle corresponding to an electronic waybill number.

The carrier management client software 622 in the enterprise operation management client 620 is configured for abnormal driver behavior and fatigue state monitoring and alarm, driver overtime driving alarm and management, driver and passenger archive management, and driver behavior evaluation.

Through the abnormal driver behavior and fatigue state monitoring and alarm, monitoring and alarm information of an abnormal sentiment, an abnormal behavior, and a fatigue state of the driver may be received and displayed. When a high-risk alarm is received, warning information is sent to the driver and passenger service client in the form of a text, an image, a voice, a file, or the like. When a high-risk alarm is received, warning information is sent to the driver and passenger service client in the form of a text, an image, a voice, a file, or the like, and linkage management information is immediately synchronously sent to the government industry management client according to the set emergency plan.

Through the driver overtime driving alarm management, driver overtime driving alarm information may be received and displayed. When an alarm is received, warning information is sent to the driver and passenger service client in the form of a text, an image, a voice, a file, or the like. When a high-risk-level alarm is received, warning information is sent to the driver and passenger service client in the form of a text, an image, a voice, a file, or the like, and linkage management information is immediately synchronously sent to the government industry management client according to the set emergency plan.

Through the driver and passenger archive management, archives of the driver and the passenger such as the driver or the escort of the hazardous chemicals transportation vehicle, and other passengers may be managed. Content of the archive management includes information such as a name, a gender, an identity number, a qualification certificate number, a validity of the qualification certificate, a personnel category, a personnel registered residence address, an actual residential address, family members, main social relations, and the like.

The driver and passenger archive management supports querying, addition, deletion, and modification and editing of the archive content of the driver and passenger. During addition, deletion, and editing of the archive information content of the driver and passenger, prompt information is sent to the driver and passenger service client, and the addition, deletion, or editing becomes effective after a corresponding person whose information was subjected to the addition or deletion or whose archive information was modified or edited logs in and confirms the addition, deletion, or editing. The driver and the passenger may submit an addition, deletion, modification, or edition application through the driver and passenger service client, confirm an archiving manner through the carrier management client, and subject the driver and passenger archive information to the addition, deletion, modification, or editing.

The driver behavior evaluation supports driver behavior evaluation based on relevant information such as different alarm types, alarm numbers, alarm levels, alarm processing statuses, and the like. For different alarm types, alarm numbers, alarm levels, alarm processing response times, and alarm processing rates, different weights are assigned, and the weights may be set and adjusted. Driver behavior evaluation results may be quantified, results of the quantification may be ranked, and corresponding report forms may be generated. Querying may be performed based on ranks of the quantified evaluation results, vehicle type information, license plate number information, or driver information.

The receiver management client software 623 of the enterprise operation management client 620 is configured for driver identity information querying. For example, when used in a hazardous goods transportation vehicle, the receiver management client software 623 supports querying of identity information, a qualification certificate, and a current transportation identity verification result of a current transportation driver or an escort of the hazardous goods transportation vehicle corresponding to an electronic waybill number.

Figure 12:
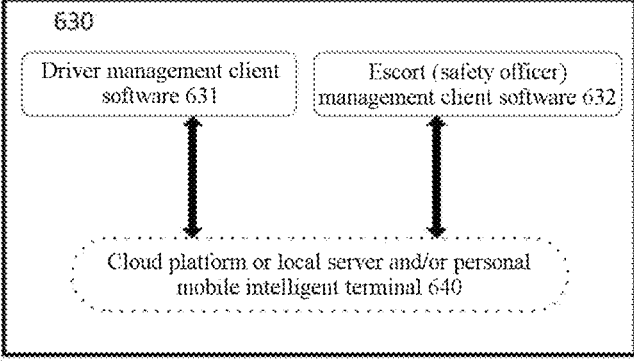
FIG. 12 is a schematic diagram of a composition principle of a driver and passenger service client of the remote management unit according to an embodiment of the present invention.

FIG. 12 is a schematic diagram of a composition principle of the driver and passenger service client 630 of the remote management unit of the active safety driver assistance system according to an embodiment.

As shown in FIG. 12, the driver and passenger service client 630 of the remote management unit 600 of the active safety driver assistance system provided in this embodiment includes a driver service client software 631 and an escort (safety officer) service client software 632 depending on different users. For commercial vehicles such as taxis and online vehicles and rental cars on various platforms, merely the driver service client software 631 may be retained.

The driver service client software 631 of the driver and passenger service client 630 is configured for abnormal driver behavior and fatigue state monitoring and alarm and driver overtime driving alarm.

For example, through the abnormal driver behavior and fatigue state monitoring and alarm, abnormal driver behavior and fatigue state monitoring and alarm information may be received and displayed. When a medium-risk-level or low-risk-level alarm is received, warning information is sent through a voice or a specific preset sound. When a high-risk alarm sent by the government industry management client and the carrier management client software is received, warning information is sent through a voice set for high level alarm content or a preset sound for a specific high level alarm, and a correction status and a correction measure may be fed back within a specified time in the form of a text, an image, a voice, a file, or the like.

Through the driver overtime driving alarm, the driver overtime driving alarm information may be received and displayed. When an overtime driving alarm sent by the government industry management client and the carrier management client software is received, warning information is broadcast through voice, and a correction status of an overtime driving violation is automatically fed back to the government industry management client and the carrier management client software after the overtime driving violation of the vehicle is corrected.

The escort (safety officer) service client software 632 of the driver and passenger service client 630 is configured for abnormal driver behavior and fatigue state monitoring and alarm and driver overtime driving alarm.

For example, through the abnormal driver behavior and fatigue state monitoring and alarm, abnormal driver behavior and fatigue state monitoring and alarm information may be received and displayed. When a medium-risk-level or low-risk-level alarm is received, warning information is sent through a voice or a specific preset sound. When a high-risk alarm delivered by the government industry management client and the carrier management client software is received, warning information is sent through a voice set for high level alarm content or a preset sound for a specific high level alarm, the escort is continuously prompted through a voice to supervise the driver in correcting the abnormal behavior or stopping and resting when appropriate, and a correction status and a correction measure may be fed back within a specified time in the form of a text, an image, a voice, a file, or the like.

Through the driver overtime driving alarm, the driver overtime driving alarm information may be received and displayed. When an overtime driving alarm delivered by the government industry management client and the carrier management client software is received, warning information is broadcast through a voice or a preset sound, the escort is continuously prompted through a voice to supervise the driver in stopping and resting when appropriate and a correction status of an overtime driving violation is automatically fed back to the government industry management client and the carrier management client software after the overtime driving violation of the vehicle is corrected.

Figure 13:
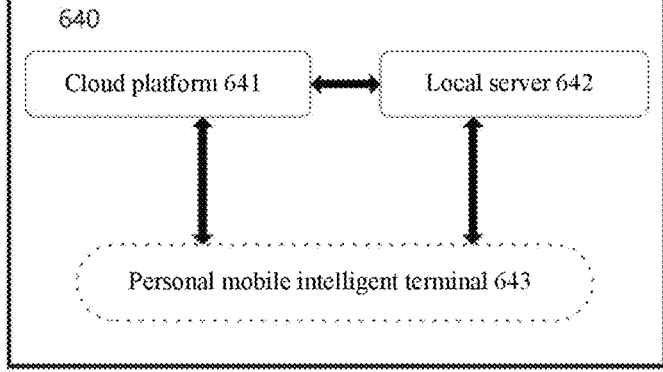
FIG. 13 is a schematic diagram of a composition principle of a communication center of the remote management unit according to an embodiment of the present invention.

Further, FIG. 13 is a schematic diagram of a composition of the communication center 640 of the remote management unit of the active safety driver assistance system according to an embodiment. As shown in FIG. 13, the communication center 640 of the remote management unit 600 of the active safety driver assistance system provided in this embodiment includes a cloud platform 641, a local server 642, and a personal mobile intelligent terminal 643.

The embodiment preferably adopts an application manner of combining the cloud platform and the personal mobile intelligent terminal for the communication center, which may be determined based on actual communication conditions of different users, and is not limited herein.

The cloud platform 641 of the communication center 640 is configured to for storage of data information uploaded by the driver state monitoring unit 200, intelligent analysis, identification, or determination based on the data information uploaded by the driver state monitoring unit 200, receipt of data of the government industry management client software 610/the enterprise operation management client software 620/the driver and passenger service client software 630, and communication interaction among a called shared data resource pool, a computer hardware platform environment supporting application of the government industry management client software 610/the enterprise operation management client software 620/the driver and passenger service client software 630, the government industry management client software 610/the enterprise operation management client software 620/the driver and passenger service client software 630, and the on-board gateway unit 300.

The cloud platform 641 communicates with the on-board gateway unit 300, receives and stores the dynamic facial expression information of the current driver acquired by the high-speed face photographing device 211 in the real-time sentiment identification module 210 in the driver state monitoring unit 200, the head and face movement information and the body movement and pose information of the current driver respectively acquired by the head and face video acquisition device 221 and the panoramic body video acquisition device 222 in the abnormal behavior monitoring module 220, the head and face movement information of the current driver acquired by the head and face video acquisition device 231 in the fatigue state monitoring module 230 and the load state information of the different points of the seat under the driver acquired by the seat load state acquisition device 233, or the driver state monitoring result forwarded by the driver state monitoring unit 200 through the on-board gateway unit 300.

When the abnormal behavior analysis and identification component, the video analysis-based fatigue state analysis component, or the sensor network analysis-based fatigue state analysis component is arranged on the cloud platform 641, through the cloud platform 641, intelligent sentiment analysis and identification, abnormal behavior analysis and identification, fatigue state analysis and determination are performed, and a management command or a response command of the government industry management client software 610, the enterprise operation management client software 620, and the driver and passenger service client software 630 is forwarded to the on-board gateway unit 300.

The cloud platform 641 supports a B/S monitoring client application, and the B/S monitoring client is preferably developed based on a latest version high-security operating system in China and a high-security browser (Xin Chuang version) in China.

The local server 642 of the communication center 640 is configured to for storage of data information uploaded by the driver state monitoring unit 200, intelligent analysis, identification, or determination based on the data information uploaded by the driver state monitoring unit 200, receipt of data of the government industry management client software 610/the enterprise operation management client software 620/the driver and passenger service client software 630, and communication interaction among a called data source, a computer hardware platform environment supporting application of the government industry management client software 610/the enterprise operation management client software 620/the driver and passenger service client software 630, the government industry management client software 610/the enterprise operation management client software 620/the driver and passenger service client software 630, and the on-board gateway unit 300.

The local server 642 communicates with the on-board gateway unit 300, receives and stores the dynamic facial expression information of the current driver acquired by the high-speed face photographing device 211 in the real-time sentiment identification module 210 in the driver state monitoring unit 200, the head and face movement information and the body movement and pose information of the current driver respectively acquired by the head and face video acquisition device 221 and the panoramic body video acquisition device 222 in the abnormal behavior monitoring module 220, the head and face movement information of the current driver acquired by the head and face video acquisition device 231 in the fatigue state monitoring module 230 and the load state information of the different points of the seat under the driver acquired by the seat load state acquisition device 233, or the driver state monitoring result forwarded by the driver state monitoring unit 200 through the on-board gateway unit 300.

When the abnormal behavior analysis and identification component, the video analysis-based fatigue state analysis component, or the sensor network analysis-based fatigue state analysis component is arranged on the local server 642, through the local server 642, intelligent sentiment analysis and identification, abnormal behavior analysis and identification, fatigue state analysis and determination are performed, and a management command or a response command of the government industry management client software 610, the enterprise operation management client software 620, or the driver and passenger service client software 630 is forwarded to the on-board gateway unit 300.

The local server 642 supports a C/S monitoring client application, and the C/S monitoring client is developed based on various latest version high-security operating systems of Linux kernel.

The personal handheld intelligent terminal 643 of the communication center 640 is configured for communication interaction among an online querying tool and a temporary storage space of the data information uploaded by the driver state monitoring unit 200, a computer hardware environment supporting application of the government industry management mobile client APP software 610/the enterprise operation management mobile client APP software 620/the driver and passenger service mobile client APP software 630, the government industry management mobile client APP software 610/the enterprise operation management mobile client APP software 620/the driver and passenger service mobile client APP software 630, and the cloud platform 641 or the local server 642 or the on-board gateway unit 300.

The personal handheld intelligent terminal 643 communicates with the on-board gateway unit 300 through the cloud platform 641 or the local server 642, receives driver state monitoring and alarm information forwarded by the driver state monitoring unit 200 through the on-board gateway unit 300 and through the cloud platform 641 or the local server 642, and forwards a management command or a response command of the government industry management mobile client APP software 610/the enterprise operation management mobile client APP software 620/the driver and passenger service mobile client APP software 630 to the on-board gateway unit 300.

The personal handheld intelligent terminal 643 supports a mobile monitoring client APP application, and the mobile monitoring client APP is preferably developed based on a Linux kernel-based operating system such as HarmonyOS microkernel or Android.

The remote management unit 600 composed of the government industry management client software 610, the enterprise operation management client software 620, the driver and passenger service client software 630, and the communication center 640 is arranged on a cloud platform of a vehicle transportation-related government industry administration department and/or a local storage server and/or a personal handheld intelligent terminal of a relevant management person, a cloud platform of a transportation enterprise to which the vehicle belongs and a transportation-related party and/or a local storage server and/or a personal handheld intelligent terminal of a relevant management person, and a personal handheld intelligent terminal of a driver and passenger, and is connected to the on-board gateway unit.

The remote management unit 600 receive the driver state monitoring result sent by the on-board gateway unit 300 and provide the vehicle and driver management control command; or receives the driver state monitoring information acquisition result sent by the on-board gateway unit 300, performs identification, analysis, or determination based on the real-time sentiment and/or the abnormal driving behavior and/or the fatigue state of the driver, and provides the vehicle and driver management control command based on the sentiment identification result and/or the abnormal behavior analysis result and/or the fatigue state determination result; feeds back the vehicle and driver management control command to the on-board gateway unit 300; feeds back the vehicle and driver management control command to the alarm prompt unit 400 or the vehicle control unit 500 through the on-board gateway unit 300; and sends an acousto-optic alarm or a voice prompt or control the vehicle to perform speed limit, deceleration, or emergency braking.

During operation, the active safety driver assistance system based on real-time driver state monitoring may monitor the real-time sentimental state, driving behavior, and fatigue state of the driver during traveling, and can realize automatic linkage in an active driving assistant safety prevention way to control a travelling state of a vehicle and provide a safety warning for the driver based on a monitoring result, to prevent an unsafe driving behavior caused by an abnormal sentiment, an abnormal behavior, and overfatigue of the driver, thereby ensuring transportation and travelling safety of the vehicle.

Finally, it should be noted that the foregoing method, or a specific system unit, or a part of the unit of the present invention may be arranged in physical media such as a hard disk, a compact disc, or any electronic device (such as a smart phone or a computer-readable storage medium) through program code. When a machine loads and executes the program code (for example, the smart phone loads and executes the program code), the machine becomes a device for implementing the present invention. The foregoing method and device of the present invention may be further transmitted through some transmission media, such as a cable, an optical fiber, or any other transmission form in the form of program code. When the program code is received, loaded, and executed by the machine (for example, a smart phone), the machine becomes the device for implementing the present invention.

The basic principles, main features, and advantages of the present invention are shown and described above. A person skilled in the art should understand that the present invention is not limited by the foregoing embodiments. The foregoing embodiments and the description in the specification only illustrate the principles of the present invention, and there will be various changes and improvements in the present invention without departing from the spirit and scope of the present invention. These changes and improvements fall within the protection scope of the present invention. The protection scope of the present invention is defined by the appended claims and equivalents.

What is claimed is:

1. An active safety driver assistance system based on real-time driver state monitoring, comprising:

a driver state monitoring unit comprising an abnormal behavior monitoring module, configured to: monitor a sentiment and/or a driving behavior and/or a physical fatigue state of a driver in real time, perform sentiment identification and/or behavior analysis and/or fatigue state determination, be associated with a vehicle control unit directly or through an on-board gateway unit based on a real-time sentiment identification result and/or an abnormal behavior analysis result and/or a fatigue state determination result, and intelligently control an operating state of a vehicle; the driver state monitoring unit monitors a sentiment and/or a driving behavior and/or a physical fatigue state of a driver in real time, which may be transmitted to a remote management unit for the sentiment identification and/or the behavior analysis and/or the fatigue state determination through an edge computing module of the state monitoring unit hardware, an edge computing module of the on-board gateway unit, or a network communication module of the on-board gateway unit, be associated with the vehicle control unit directly or through the on-board gateway unit based on the real-time sentiment identification result and/or the abnormal behavior analysis result and/or the fatigue state determination result or a management command generated acquired from the remote management unit through the on-board gateway unit that is generated based on the real-time sentiment identification result and/or the abnormal behavior analysis result and/or the fatigue state determination result, and controls an operating state of an anti-lock module, a speed limit management module, an intelligent brake management module, or an electronic brake assist module to perform speed limit, speed control, or deceleration;

the on-board gateway unit, associated with the driver state monitoring unit, the vehicle control unit, an alarm prompt unit, and a remote management unit and configured to complete driver state monitoring in cooperation with the driver state monitoring unit;

the vehicle control unit, linked to a starting system, a speed control system, and a braking system of the vehicle, associated with the on-board gateway unit and the driver state monitoring unit, and configured to control a travelling state of the vehicle based on the real-time sentimental state analysis result, the driving behavior analysis result, and the fatigue state determination result of the driver sent by the driver state monitoring unit or the on-board gateway unit;

the alarm prompt unit, connected to and in cooperation with the driver state monitoring unit and the on-board gateway unit;

the remote management unit, configured to: complete the driver state monitoring through cooperation between the vehicle control unit and the driver state monitoring unit, provide a corresponding vehicle and driver management control command, and feed back the vehicle and driver management control command to the on-board gateway unit, and wherein the abnormal behavior monitoring module of the driver state monitoring unit comprises a head and face video acquisition device, a panoramic body video acquisition device, and an abnormal behavior analysis and identification device;

the head and face video acquisition device is configured to acquire head and face movements of the current driver;

the panoramic body video acquisition device is configured to acquire a body movement and a pose of the current driver; and the abnormal behavior analysis and identification device is configured to perform intelligent analysis and identification based on the head and face movements acquired by the head and face video acquisition device and the body movement and the pose acquired by the panoramic body video acquisition device, to determine whether a real-time behavior state of the current driver is abnormal.

2. The active safety driver assistance system according to claim 1, wherein the driver state monitoring unit comprises a real-time sentiment identification module and/or a fatigue state monitoring module; the real-time sentiment identification module is configured to obtain a dynamic facial expression of a current driver, and transmit the obtained dynamic facial expression to an intelligent sentiment analysis module thereof or an intelligent sentiment analysis module of the on-board gateway unit, or to an intelligent sentiment analysis module of the remote management unit through the on-board gateway unit; the abnormal behavior monitoring module is configured to obtain a face movement or a body movement of the current driver, and transmit the obtained face movement or body movement to an abnormal behavior analysis module thereof or an abnormal behavior analysis module of the on-board gateway unit, or to an abnormal behavior analysis module of the remote management unit through the on-board gateway unit; and the fatigue state monitoring module is configured to obtain fatigue state monitoring information of the current driver, and transmit the fatigue state monitoring information to a fatigue state determination module thereof or a fatigue state determination module of the on-board gateway unit, or to a fatigue state determination module of the remote management unit through the on-board gateway unit.

3. The active safety driver assistance system according to claim 2, wherein the real-time sentiment identification module of the driver state monitoring unit comprises a high-speed face photographing device and an intelligent sentiment analysis and identification device;

the high-speed face photographing device is configured to acquire the dynamic facial expression of the current driver; and the intelligent sentiment analysis and identification device is configured to perform intelligent analysis and identification based on the dynamic facial expression acquired by the high-speed face photographing device, and determine a real-time sentimental state of the current driver.

4. The active safety driver assistance system according to claim 2, wherein the fatigue state monitoring module of the driver state monitoring unit comprises a head and face video acquisition device, a video analysis-based fatigue state analysis device, a seat load state acquisition device, and a sensor network analysis-based fatigue state analysis device;

the head and face video acquisition device is configured to acquire head and face movements of the current driver;

the video analysis-based fatigue state analysis device is configured to perform intelligent analysis and identification based on the head and face movements acquired by the head and face video acquisition device, to determine a fatigue degree of the real-time state of the current driver;

the seat load state acquisition device is configured to acquire a load distribution of different points of a seat under the driver; and the sensor network analysis-based fatigue state analysis device is configured to perform intelligent analysis and identification based on the load state of the different points of the seat under the driver acquired by the seat load state acquisition device, and determine a fatigue degree of the real-time state of the current driver.

5. The active safety driver assistance system according to claim 1, wherein the on-board gateway unit comprises a network communication module and/or a data storage module and/or an edge computing module;

the network communication module comprises one or more of a 5G communication device, a CAN bus communication device, a TCP/IP communication device, a Bluetooth communication device, and another wireless communication device, and is configured for data exchange between the driver state monitoring unit and the alarm prompt unit, the vehicle control unit, and the remote management unit;

the data storage module comprises a built-in data storage device and an external data storage device, and is configured to store data exchanged between the driver state monitoring unit and the alarm prompt unit, the vehicle control unit, and the remote management unit; and the edge computing module comprises an AI smart chip with an edge computing function and a terminal SDK with an edge computing function, and is configured to perform intelligent sentiment analysis and identification and/or abnormal behavior analysis and identification and/or fatigue state analysis and determination based on the data exchanged between the driver state monitoring unit and the alarm prompt unit, the vehicle control unit, and the remote management unit.

6. The active safety driver assistance system according to claim 1, wherein the alarm prompt unit comprises a vehicle local alarm prompt subunit and a remote monitoring client software alarm prompt subunit.

7. The active safety driver assistance system according to claim 1, wherein the vehicle control unit comprises an ACC vehicle start control module and/or an anti-lock module and/or a speed limit management module and/or an intelligent brake management module and/or an electronic brake assist module, and when the vehicle control unit receives an abnormal driver state detection result, the vehicle control unit controls the vehicle to perform speed limit, deceleration, or emergency braking;

the ACC vehicle start control module is configured to control an on state of a vehicle switch based on a driver identity verification result;

the anti-lock module is configured to prevent possible travelling direction runaway or sideslip of the vehicle during emergency braking when receiving an abnormal driver state monitoring result;

the speed limit management module is configured to control a maximum travelling speed of the vehicle when receiving the abnormal driver state monitoring result;

the intelligent brake management module is configured to start an intelligent braking device to reduce a real-time travelling speed of the vehicle when receiving the abnormal driver state monitoring result; and the electronic brake assist module is configured to quickly start a full braking force for emergency braking when receiving the abnormal driver state monitoring result.

8. The active safety driver assistance system according to claim 1, wherein the remote management unit comprises a government industry management client, an enterprise operation management client, a driver and passenger service client, and a communication center;

the government industry management client of the remote management unit comprises a public security industry management client software, a traffic industry management client software, an emergency industry management client software, and another industry management client software depending on different industry administration departments;

the enterprise operation management client of the remote management unit comprises a consigner management client software, a carrier management client software, and a receiver management client software depending on different users;

the driver and passenger service management client of the remote management unit comprises a driver service client software and an escort service client software depending on different users; and the communication center of the remote management unit comprises a cloud platform, a local server, and a personal mobile intelligent terminal.

9. The active safety driver assistance system according to claim 8, wherein the remote management unit is configured to: receive a driver state monitoring result sent by the on-board gateway unit and provide a vehicle and driver management control command; or receive a driver state monitoring information acquisition result sent by the on-board gateway unit, perform identification, analysis, or determination based on the real-time sentiment and/or the abnormal driving behavior and/or the fatigue state of the driver, and provide a vehicle and driver management control command based on the sentiment identification result and/or the abnormal behavior analysis result and/or the fatigue state determination result; feed back the vehicle and driver management control command to the on-board gateway unit; feed back the vehicle and driver management control command to the alarm prompt unit or the vehicle control unit through the on-board gateway unit; and send an acousto-optic alarm or a voice prompt or intelligently control the vehicle.

10. The active safety driver assistance system according to claim 1, wherein the remote management unit is configured to: receive a driver state monitoring result sent by the on-board gateway unit and provide a vehicle and driver management control command; or receive a driver state monitoring information acquisition result sent by the on-board gateway unit, perform identification, analysis, or determination based on the real-time sentiment and/or the abnormal driving behavior and/or the fatigue state of the driver, and provide a vehicle and driver management control command based on the sentiment identification result and/or the abnormal behavior analysis result and/or the fatigue state determination result; feed back the vehicle and driver management control command to the on-board gateway unit; feed back the vehicle and driver management control command to the alarm prompt unit or the vehicle control unit through the on-board gateway unit; and send an acousto-optic alarm or a voice prompt or intelligently control the vehicle.

* * * * *